US006856660B1

(12) United States Patent
Watanabe et al.

(10) Patent No.: US 6,856,660 B1
(45) Date of Patent: Feb. 15, 2005

(54) SIGNAL PROCESSING METHOD AND APPARATUS AND DISK DEVICE USING THE METHOD AND APPARATUS

(75) Inventors: Yoshiju Watanabe, Kanagawa-ken (JP); Masaharu Kondo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/400,856

(22) Filed: Sep. 21, 1999

Related U.S. Application Data

(63) Continuation-in-part of application No. 08/948,942, filed on Oct. 10, 1997.

(30) Foreign Application Priority Data

| Oct. 11, 1996 | (JP) | ................................. 8-289188 |
| Sep. 21, 1998 | (JP) | ................................. 10-265896 |

(51) Int. Cl.[7] .............................................. H04L 7/00
(52) U.S. Cl. ....................... 375/364; 375/363; 375/365; 375/366; 375/368
(58) Field of Search ................................. 375/340, 219, 375/354–376; 370/513; 360/51; 369/59.19, 59.21; 386/91; 714/769

(56) References Cited

U.S. PATENT DOCUMENTS

| 4,398,224 | A | | 8/1983 | Watanabe ..................... 386/91 |
| 4,620,300 | A | * | 10/1986 | Ogawa .................... 369/30.27 |
| 4,748,623 | A | * | 5/1988 | Fujimoto .................... 370/513 |
| 5,140,618 | A | * | 8/1992 | Kinoshita et al. ........... 375/368 |
| 5,218,691 | A | * | 6/1993 | Tuma et al. .................. 703/24 |
| 5,331,618 | A | | 7/1994 | Nagai .......................... 369/59 |
| 5,341,249 | A | | 8/1994 | Abbott et al. |
| 5,402,276 | A | | 3/1995 | Honma et al. ................ 360/51 |
| 5,590,159 | A | | 12/1996 | Anderson .................... 375/340 |
| 5,844,920 | A | * | 12/1998 | Zook et al. .................. 714/769 |
| 5,852,630 | A | * | 12/1998 | Langberg et al. ............ 375/219 |
| 6,185,173 | B1 | * | 2/2001 | Livingston et al. ...... 369/59.21 |

FOREIGN PATENT DOCUMENTS

| JP | 58-169341 | 10/1983 |
| JP | 5-74051 | 3/1993 |
| JP | 5-159462 | 6/1993 |
| JP | 5-334810 | 12/1993 |
| JP | 7-182786 | 7/1995 |
| JP | 11251927 | 9/1999 |

* cited by examiner

*Primary Examiner*—Stephen Chin
*Assistant Examiner*—Curtis Odom
(74) *Attorney, Agent, or Firm*—Antonelli, Terry, Stout & Kraus, LLP

(57) ABSTRACT

A signal processing circuit having a data sync signal detector and a disk device. Input data read from a magnetic disk is input to a data discriminator. A data discrimination output constituting a code bit output discriminated by the data discriminator is input to a post-coder the output of which is input to a decoder and a (1+D) processing unit. The processed output of the processing unit is input to an error detection/correction unit and separated into bit strings of odd numbered bits and even numbered bits, divided into groups. An error detection/correction output is input to a data sync signal detector, and matched against a sync pattern. When the number of coincident groups is greater than a threshold value, a sync signal is output and upon detection causes the decoder to demodulate the data.

33 Claims, 20 Drawing Sheets

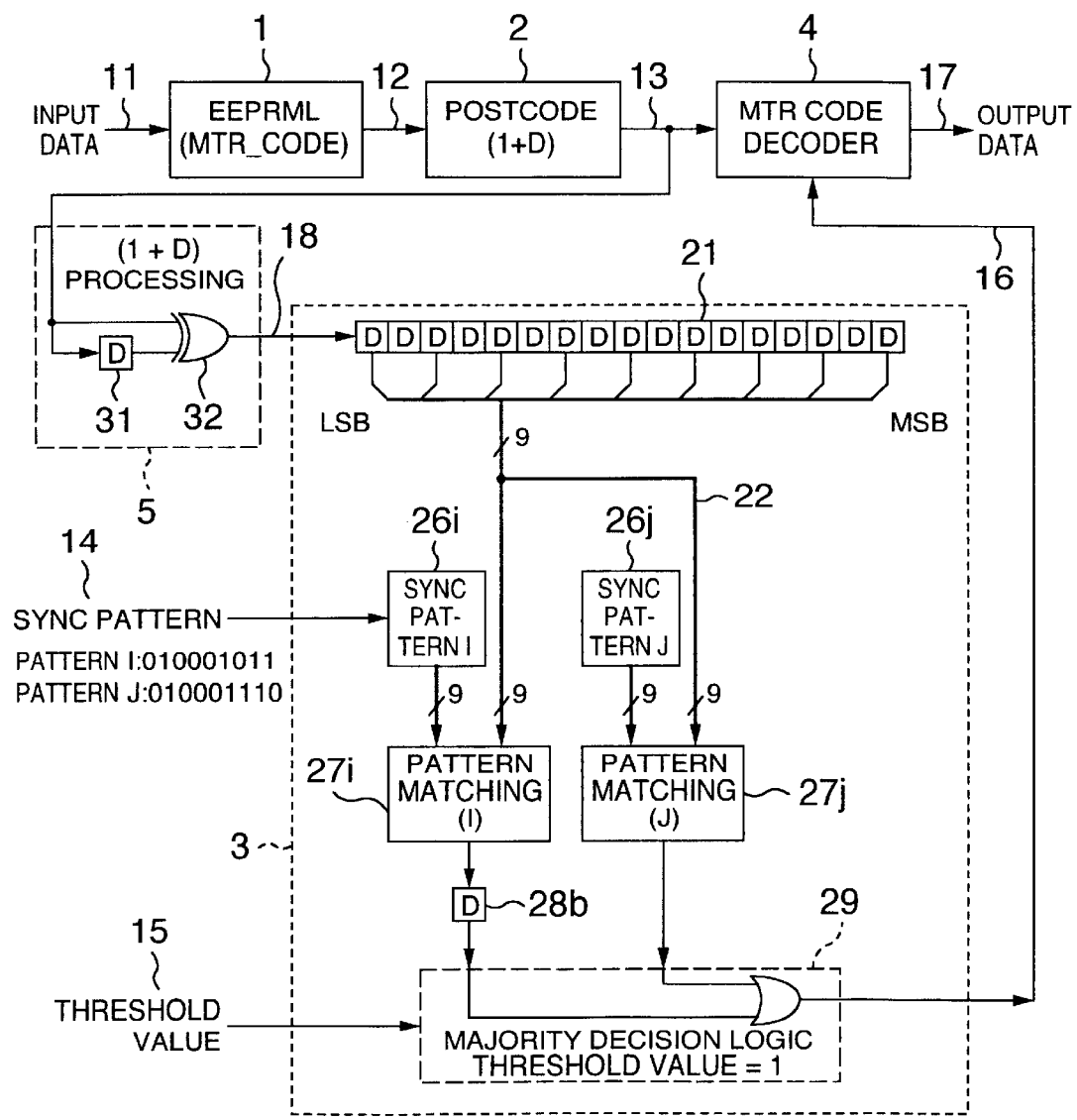

FIG.4

| ERROR PATTERN (IN ML) | dmin$^2$ | ERROR RATE (%) (BIT ERROR RATE=0.0004) (ber=4e-4) | (1+D) | (1+D)$^2$ | ERROR PATTERN AFTER (1+D)$^2$ INTERLEAVE | REMARKS |
|---|---|---|---|---|---|---|
| x | 10 | 87.816 | xx | x0x | xx | |
| xx | 12 | 0.843 | x0x | xxxx | xx, xx | |
| xxx | 6 | 0.000 | x00x | xx0xx | xx, x0x | *1 |
| x0x | 12 | 1.125 | xxxx | x000x | x0x | |
| x00x | 12 | 10.122 | xx0xx | x0xx0x | xx, xx | |
| x000x | 18 | 0.094 | xx00xx | x0x0x0x | xxxx | |

(NOTE) : x INDICATES ERROR BIT, 0 NO-ERROR BITS
*1: NO ERROR OCCURS IN THE ABSENCE OF
    CONTINUOUS DATA INVERSION PATTERN

FIG.5

| ITEM | POLYNOMIAL |
|---|---|
| a | $X^5 + X^2 + 1$ |
| b | $X^5 + X^3 + 1$ |
| c | $X^5 + X^3 + X^1 + 1$ |
| d | $X^5 + X^3 + X^2 + X^1 + 1$ |
| e | $X^5 + X^4 + X^2 + 1$ |
| f | $X^5 + X^4 + X^2 + X^1 + 1$ |
| g | $X^5 + X^4 + X^3 + X^1 + 1$ |
| h | $X^5 + X^4 + X^3 + X^2 + 1$ |

MSB [ ][ ][ ][ ][▓][▓][▓][▓][▓] LSB

CODE (4BIT) | CRCC (5BIT)

| ERROR PAT-TERN | ERROR POSITION | | | | | | | | | SYNDROME VALUE | | | | | | | |
|---|---|---|---|---|---|---|---|---|---|---|---|---|---|---|---|---|---|
| | MSB | | | | | | | | LSB | GENERATOR POLYNOMIAL | | | | | | | |
| | 8 | 7 | 6 | 5 | 4 | 3 | 2 | 1 | 0 | a | b | c | d | e | f | g | h |
| 1 | x | | | | | | | | | 13 | 26 | 14 | 9 | 22 | 10 | 15 | 28 |
| 2 | x | x | | | | | | | | 25 | 23 | 9 | 26 | 29 | 15 | 21 | 18 |
| 3 | | x | x | | | | | | | 30 | 31 | 17 | 13 | 20 | 28 | 23 | 9 |
| 4 | | | x | x | | | | | | 15 | 27 | 29 | 17 | 10 | 14 | 22 | 26 |
| 5 | | | | x | x | | | | | 21 | 25 | 27 | 31 | 5 | 7 | 11 | 13 |
| 6 | | | | | x | x | | | | 24 | 24 | 24 | 24 | 24 | 24 | 24 | 24 |
| 7 | | | | | | x | x | | | 12 | 12 | 12 | 12 | 12 | 12 | 12 | 12 |
| 8 | | | | | | | x | x | | 6 | 6 | 6 | 6 | 6 | 6 | 6 | 6 |
| 9 | | | | | | | | x | x | 3 | 3 | 3 | 3 | 3 | 3 | 3 | 3 |
| 10 | | | | | | | | | x | 1 | 1 | 1 | 1 | 1 | 1 | 1 | 1 |

FIG.8

| ERROR PAT-TERN | ERROR POSITION ||||||||| SYNDROME VALUE ||
| --- | --- | --- | --- | --- | --- | --- | --- | --- | --- | --- | --- |
| | MSB ||||||||LSB| GENERATOR POLYNOMIAL ||
| | 8 | 7 | 6 | 5 | 4 | 3 | 2 | 1 | 0 | d | h |
| 1 | x | | | | | | | | | 9 | 28 |
| 2 | x | x | | | | | | | | 26 | 18 |
| 3 | | x | x | | | | | | | 13 | 9 |
| 4 | | | x | x | | | | | | 17 | 26 |
| 5 | | | | x | x | | | | | 31 | 13 |
| 6 | | | | | x | x | | | | 24 | 24 |
| 7 | | | | | | x | x | | | 12 | 12 |
| 8 | | | | | | | x | x | | 6 | 6 |
| 9 | | | | | | | | x | x | 3 | 3 |
| 10 | | | | | | | | | x | 1 | 1 |
| 11 | | x | | | | | | | | 19 | 14 |
| 12 | x | | x | | | | | | | 23 | 27 |
| 13 | | x | | x | | | | | | 28 | 19 |
| 14 | | | x | | x | | | | | 14 | 23 |
| 15 | | | | x | | x | | | | 7 | 21 |
| 16 | | | | | x | | x | | | 20 | 20 |
| 17 | | | | | | x | | x | | 10 | 10 |
| 18 | | | | | | | x | | x | 5 | 5 |
| 19 | | | | | | | | x | | 2 | 2 |

FIG.16

| No. | SYNC PATTERN 8 7 6 5 4 3 2 1 0 | No. | SYNC PATTERN 8 7 6 5 4 3 2 1 0 |
|---|---|---|---|
| 1 | 0 0 0 1 0 1 0 0 1 | 23 | 0 1 1 1 0 0 0 0 1 |
| 2 | 0 0 0 1 0 1 0 1 1 | 24 | 0 1 1 1 0 1 0 1 1 |
| 3 | 0 0 0 1 0 1 1 1 1 | 25 | 0 1 1 1 0 1 1 0 0 |
| 4 | 0 0 0 1 1 0 1 0 1 | 26 | 1 0 0 0 0 1 1 0 1 |
| 5 | 0 0 0 1 1 0 1 1 1 | 27 | 1 0 0 0 1 0 1 1 0 |
| 6 | 0 0 0 1 1 1 0 1 1 | 28 | 1 0 0 0 1 1 0 1 0 |
| 7 | 0 0 0 1 1 1 1 0 1 | 29 | 1 0 0 0 1 1 1 0 0 |
| 8 | 0 0 1 0 0 0 1 1 1 | 30 | 1 0 0 1 0 0 0 1 1 |
| 9 | 0 0 1 0 0 1 1 0 1 | 31 | 1 0 1 0 0 0 1 1 1 |
| 10 | 0 0 1 0 1 1 1 1 0 | 32 | 1 0 1 0 0 1 0 0 1 |
| 11 | 0 0 1 1 0 1 1 1 0 | 33 | 1 0 1 0 1 0 0 1 1 |
| 12 | 0 0 1 1 1 0 1 1 0 | 34 | 1 0 1 0 1 0 1 1 1 |
| 13 | 0 1 0 0 0 0 1 0 1 | 35 | 1 0 1 0 1 1 0 0 0 |
| 14 | 0 1 0 0 0 0 1 1 1 | 36 | 1 0 1 0 1 1 0 1 1 |
| 15 | 0 1 0 0 0 1 0 1 1 | 37 | 1 0 1 1 0 0 1 1 0 |
| 16 | 0 1 0 0 0 1 1 0 1 | 38 | 1 0 1 1 1 0 0 1 1 |
| 17 | 0 1 0 0 0 1 1 1 0 | 39 | 1 1 0 0 1 0 1 1 1 |
| 18 | 0 1 0 1 1 0 0 0 1 | 40 | 1 1 0 1 0 1 1 1 0 |
| 19 | 0 1 0 1 1 0 0 1 0 | 41 | 1 1 0 1 1 1 0 0 0 |
| 20 | 0 1 0 1 1 0 0 1 1 | 42 | 1 1 0 1 1 1 1 0 0 |
| 21 | 0 1 0 1 1 1 1 0 0 | 43 | 1 1 1 0 1 0 0 1 1 |
| 22 | 0 1 1 0 1 0 0 0 1 | 44 | 1 1 1 0 1 0 1 1 0 |

SIGNAL PROCESSING METHOD AND APPARATUS AND DISK DEVICE USING THE METHOD AND APPARATUS

CROSS-REFERENCE TO RELATED APPLICATIONS

This is a continuation-in part of the U.S. application Ser. No. 08/948,942 field on Oct. 10, 1997, the disclosure of which is hereby incorporated by reference.

BACKGROUND OF THE INVENTION

The present invention relates to a signal processing technique, and a disk device such as a magnetic disk drive or a magneto-optic disk device, or more in particular to a data sync signal detection technique and a disk device using a data sync signal detection technique with an improved data sync signal detection rate in which the data sync signal can be detected even in the presence of a data discrimination error in the data sync signal field of the data read from the disk device and discriminated.

FIG. 20 shows an example of the recording format for a magnetic disk drive. The data includes an ID field and a DATA field for each sector providing a unit storage area. The ID field and the DATA field each include a PLO (Phase Locked Oscillator) SYNC field 91 for pull-in of a PLL (phase locked loop), a data sync signal 92 for detecting the starting position of an ID (address information) or data for producing a demodulation timing signal of a modulated code, an ID field for recording/reproducing the ID information or a DATA field 93 for recording/reproducing the data actually, and a CRC field or an ECC field 94 for error detection and correction. Also, there is a GAP field 95 providing a pattern for absorbing various delay time between the ID field and the DATA field or between sectors.

It is well known that accurate detection of the data sync signal 92 is very important for the subsequent code demodulation of the ID or DATA field 93. In other words, even in the case where the decode data in the ID or DATA field 93 has a very satisfactory error rate, a detection error of the data sync signal 92 which is normally about several bytes causes inaccurate code demodulation of the ID or DATA field 93 of several tens to several hundred bytes.

A method using a pattern having no continuous data inversion as a data sync signal is disclosed in JP20 A-8-096312.

In the method disclosed in USP. 5,844,920, there are provided patterns (marks) for data synchronization at two points, between which a gap (no data) or data are filled. In the case where such a gap is filled with data and the data sync detection is effected by the second data sync pattern, the data between the data sync patterns is restored by correcting an erasure pointer for the data error correction code. The provision of data sync patterns at two points makes possible data sync detection even in the case a thermal asperity (TA) occurs in the data sync pattern field.

Further, in order to improve the reproduction performance, there has been proposed a MTR (Maximum Transition Run) code in which the number of continuous magnetization inversions is limited, according to the reference "Maximum Transition Run Codes for Data Storage Systems", IEEE. Trans. Mag. Vol. 32, No. 5, September 1996, written by J. Moon and B. Brickner.

In a method of data sync detection for a signal processing apparatus having a configuration as shown in FIG. 21, input data 511 are discriminated by a data discriminator 501, and a data discrimination output 512 is subjected to a predetermined post-code processing (bit operation) in a post-coder 502. In the post-code processing, the processing corresponding to the pre-code processing at the time of recording not shown is performed. This is in order to assure correspondence between the data coding at the time of recording and the decoding at the time of reproduction. According to the method disclosed in JP-A-9-223365, it is possible to perform the processing equivalent to the post-code processing at the time of outputting the result of the state transition in the data discriminator 501. Therefore, the post coder 502 is not always necessary as an independent component element. Nevertheless, the method of JP-A-9-223365 is also considered to functionally include an independent post coder 502 having the post-coding operation separated from the data discriminator, or a post-code processing means for simply passing through the code from the data discriminator. The post-code output 513 is applied to a decoder 504. Also, the same post-code output 513 is applied to a data sync signal detector 503 and compared with a predetermined sync pattern 514. When they coincide with each other, a data sync signal 92 is detected, and applied to the decoder 504 as a sync signal detection output 516. With this signal as a decode timing signal, the decoder 504 performs the decode operation thereby to produce an output data 517.

The data sync signal detector 503 is so configured, as disclosed in U.S. patent application Ser. No. 08/948,942, that the data-discriminated code string is divided into groups of a bit string of odd numbered bits and a bit string of even numbered bits, and each group is compared with a sync pattern for coincidence. In the case where the number of coincident groups exceeds a predetermined threshold value 515, it is determined that a data sync signal has been detected. This data sync signal detection processing can exhibit a high ability of data sync signal detection.

On the other hand, the MTR code described above is the code in which the recording data is inverted by 1. When using such a code, the pre-code processing is the (1/(1+D)) processing (an input value and an output value delayed by a predetermined time are added in modulo 2 as an output value). The corresponding post-coding process is the (1+D) processing (an input value and an input value delayed by a predetermined time are added in modulo 2 as an output value). The use of the MTR code improves the data reproduction performance and shortens the error length. Even in the case where the error in the data discriminator 501 is one bit, however, it presents itself as an error of two continuous bits after the (1+D) processing of the post-coder 502. The data sync signal cannot be successfully detected, therefore, even when a code string is divided into a bit string of odd numbered bits and a bit string of even numbered bits.

In the case where a one-bit data error of the data sync signal 92 occurs in the configuration shown in FIG. 21, therefore, the data sync signal is detected erroneously, followed by the ID and DATA fields 93 all erroneous. (If a permanent bit drop-off in the data sync signal unit occurs due to a defect of the medium, etc. data for one sector cannot be correctly reproduced.)

As described above, an erroneous detection (detection not at right position or detection at an erroneous position) of the data sync signal at the head of data causes not merely the erroneous detection of the data sync signal but also all the subsequent decode processing of several hundred bytes become erroneous, resulting in the technical problem that the error rate of the whole apparatus is considerably deteriorated.

SUMMARY OF THE INVENTION

An object of the present invention is to provide a signal processing technique capable of reducing the error in the data sync signal detection.

Another object of the invention is to provide a signal processing technique capable of improving the data sync signal detection performance of a data sync signal detector with the improvement in the reproduction performance of the data field.

Still another object of the invention is to provide a signal processing technique capable of reducing the circuit size with a simple configuration of the data sync signal detector.

A further object of the invention is to provide a magnetic disk drive capable of improving the recording density by employing a signal processing system including a Maximum-Likelihood or Viterbi decoding means and reducing the error rate by the improved detection performance of the data sync signal at the same time.

A yet further object of the invention is to provide a magnetic disk drive capable of reducing the production cost by reducing the circuit size of the signal processing system for detecting the data sync signal and reducing the error rate by the improved detection performance of the data sync signal at the same time.

According to one aspect of the invention, there is provided a data sync signal detection system for a signal processing apparatus including a data discriminator for outputting a bit string of data, a post-coder for performing a predetermined post-code processing (bit operation processing) on the bit string, a decoder for decoding the post-coded bit string thereby to reproduce the data, the system comprising: a (1+D) processing unit for performing the processing of adding, in modulo-2, an input value of the bit string of the code input to the decoder to a value delayed a predetermined time from the input value ((1+D) processing) and producing an output value, a separator for dividing the bit string of the code containing data sync signals after the (1+D) processing into a bit string of odd numbered bits and a bit string of even numbered bits, each bit string being subdivided into one group or two or more groups separated with or without a bit string containing one or more bits of an arbitrary pattern interposed there between, at last one matching unit for comparing or matching the output of each group with or against a corresponding predetermined sync pattern and determining a coincidence or non-coincidence, and a decision unit supplied with the output from each matching unit for outputting a data sync signal detection signal to the decoder in the case where the number of coincident groups is equal to or more than a predetermined threshold value.

Also, an error detection/correction unit is interposed between the separator and each pattern matching unit for detecting and correcting an error of the output code separated into a bit string of odd numbered bits and a bit string of even numbered bits and matching the pattern of the code bit string thus corrected against a predetermined sync pattern.

As a result, a sync pattern capable of error detection and correction with the data inversion not continuous is selectively used as a predetermined sync pattern.

According to another aspect of the invention, there is provided a data sync signal detection apparatus comprising a data discriminator for producing a data bit string, a detector for detecting a data sync signal from the data bit string output from the data discriminator, a separator for dividing the raw data sync pattern into predetermined bit groups, a matching unit for matching each pattern with a predetermined sync pattern, and an error detection and correction unit associated with each group for detecting and correcting an error of the output from each group, wherein a code string for which the discrimination error has been corrected is matched against the data sync pattern thereby to detect a data sync signal. This detection apparatus is not provided with the (1+D) processor described above. Instead, the code bit string containing the data sync signals after post-processing is divided into groups, for each of which the discrimination error is detected and corrected, and then each group is matched against a predetermined data sync pattern.

Other objects, features and advantages of the present invention will become apparent from reading the description of the following embodiments of the invention taken in conjunction with the accompanying drawings.

BRIEF DESCRIPTION OF THE DRAWINGS

FIG. 3 is a block diagram showing a signal processing apparatus according to still another embodiment of the invention related to the embodiment shown in FIG. 1.

FIG. 4 is a diagram useful for explaining an error pattern in the output of a data discriminator according to a third embodiment.

FIG. 5 is a diagram showing a polynomial of degree 5 used with a syndrome calculator according to the embodiment of FIG. 9.

FIG. 8 is a diagram for explaining the relation between an error position and a syndrome value for each error pattern according to the embodiment of FIG. 10.

FIG. 16 shows an example of a sync pattern used with a signal processing apparatus according to the invention.

DESCRIPTION OF THE EMBODIMENTS

Embodiments of the present invention will be described in detail below with reference to the accompanying drawings.

Figure 1:
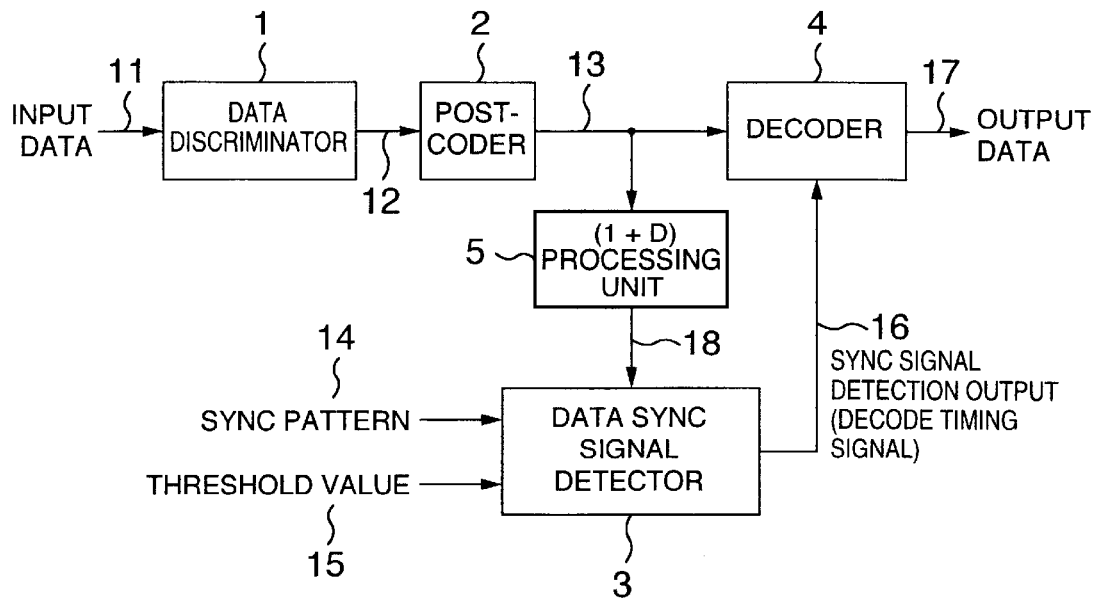
FIG. 1 is a block diagram showing a signal processing apparatus according to an embodiment of the invention.

FIG. 1 is a block diagram showing a signal processing apparatus according to an embodiment of the invention.

In FIG. 1, input data 11 are input to a data discriminator 1, and a data discrimination output 12 providing a code bit output discriminated by the data discriminator 1 is input to a post-coder 2 for performing a predetermined post-code processing. Further, a post-coder output 13 is input to a decoder 4 and a (1+D) processing unit 5. A (1+D) processing output 18 is input to a data sync signal detector 3, and is compared with or matched against a sync pattern 14 by a predetermined method. In the case where the number of pattern coincidences is not less than a threshold value 15, a sync signal detection output 16 is output. The sync signal detection output 16 is applied to the decoder 4 and gives a decode timing of the code string of the post-code output 13. As a result, a decoded output data 17 is output from the decoder 4.

Alternatively, independently of the data reproduction system including the post-coder 2 and the decoder 4, it is also possible to configure such that the data sync signal is detected from the code string obtained by subjecting the data discrimination output 12 to the post-code processing and the (1+D) processing. In other words, the code string constituting the input to the decoder 4 is not used. However, this is nothing but a parallel arrangement of post-code processing and apparently equivalent to the configuration of FIG. 1.

A signal processing apparatus according to another embodiment of the invention will be explained with reference to FIG. 2.

Figure 2:
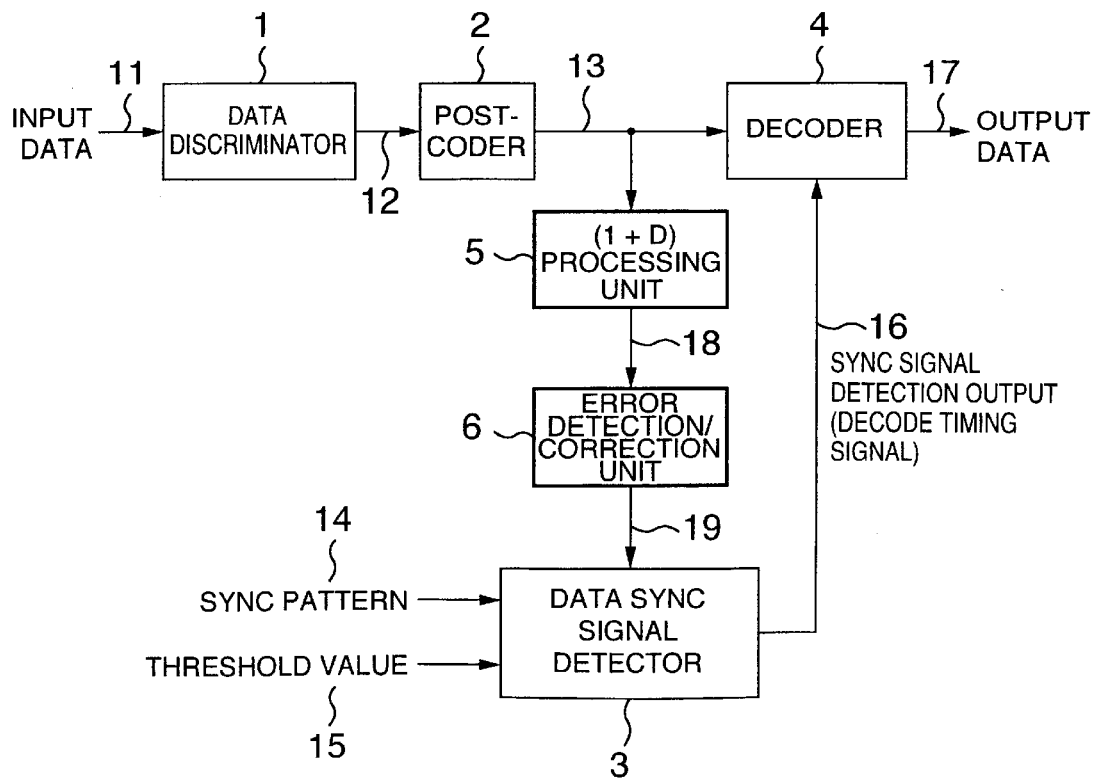
FIG. 2 is a block diagram showing a signal processing apparatus according to another embodiment of the invention.

In FIG. 2, input data 11 are input to a data discriminator 1, and a data discrimination output 12 providing a code bit output discriminated by the data discriminator 1 is input to a post-coder 2 for performing a predetermined post-code processing. Further, a post-code output 13 of the post-coder 2 is input to a decoder 4 and a (1+D) processing unit 5. A (1+D) processing output 18 of the (1+D) processing unit 5 is input to an error detection/correction unit 6. The error detection/correction unit 6 separates the (1+D) processing output 18 into a bit string of odd numbered bits and a bit string of even numbered bits, so that an error is detected and corrected of the bit strings thus grouped. The error detection and correction output 19 after error correction is input to a data sync signal detector 3, and compared with or matched against a predetermined sync pattern. In the case where the number of pattern coincidences is not less than a predetermined threshold value 15, a sync signal detection output 16 is output. The sync signal detection output 16 is input to the decoder 4 and gives a decode timing of the code string of the post code output 13, whereupon a decoded output data 17 is output from the decoder 4.

As described above, the (1+D) processing is executed and the bit string is separated into a bit string of odd numbered bits and a bit string of even numbered bits before detection of the data sync signal. In this way, the number of the types of the error pattern can be reduced while at the same time shortening the error pattern length. As a result, the error detection and correction is easily realized, and the data sync signal can be detected with a higher accuracy.

FIG. 3 is a block diagram showing a configuration of a signal processing apparatus according to the embodiment of FIG. 1 used for decoding MTR codes.

This embodiment will be explained specifically with reference to FIG. 3. An 18-bit sync pattern is used.

In FIG. 3, the decoder 4 is a MTR decoder with not more than 3 continuous "1s".

The data discriminator 1 is a Maximum Likelihood decoder or Viterbi decoder of EEPRML (Extended Extended Partial Response with Maximum Likelihood detection) type. This channel response is $(1-D)(1+D)^3$. Also, assume that the data discriminator is optimized for use with the MTR code described above. Two sync patterns "001111111100011000" and "110000000011100111" are available for the data discrimination output 12.

The post coder 2 has the characteristic of (1+D). One 18-bit sync pattern "001000000010010100" is available for the post code output 13. Also, the operation of the post-coder 2 ((1+D) processing) may be included for outputting the state transition of the data discriminator 1, and "001000000010010100" may be output as the data discrimination output 12 without providing the post-coder 2. In such a case, too, the function of the post coder 2 can be considered to be included.

The (1+D) processing unit 5 arranged before the data sync signal detector 3 is configured with a unit time delay circuit or cell 31 and an exclusive OR circuit 32. The post-code output 13 is applied to the unit time delay cell 31 and the exclusive OR circuit 32. Also, the output of the unit time delay cell 31 is input to the remaining input terminal of the exclusive OR circuit. The output of the exclusive OR circuit 32 constitutes the (1+D) processing output 18. The sync pattern in the (1+D) processing output 18 is given as a 18-bit pattern of "001100000011011110".

The (1+D) processing output 18 is applied to a shift register 21 in the data sync signal detector 3. The shift register 21 has a 17-bit configuration. This is in order to selectively use a 9-bit pattern as a sync pattern. Nine bits including every other bit of the shift register 21 are output as a shift register output 22. By use of the values of every other bit of the shift register 21, the (1+D) processing output 18 can be divided into two groups of a bit string of odd numbered bits and a bit string of even numbered bits for each operation clock not shown. The sync pattern in the shift register output 22 is one of the two 9-bit patterns of "010001011" and "010001110".

The shift register output 22 is input to a pattern matching unit 27i and a pattern matching unit 27j, and matched against the sync patterns of a sync pattern holder 26i and a sync pattern holder 26j, respectively. Each sync pattern is given as one of the sync patterns 14. The sync pattern holder 26i holds the 9-bit pattern of "010001011", and the sync pattern holder 26j holds the 9-bit pattern of "010001110". In order to assure the same timing of the outputs of the pattern matching unit 27i and the pattern matching unit 27j, the output of the pattern matching unit 27i is delayed through a unit time delay circuit 28b and input to a majority decision logic circuit (decision circuit) 29.

The majority decision logic circuit 29 compares the number of coincidences between the two pattern matching results with the value of the threshold level 15, and in the case where the number of coincidences of the pattern matching result is not less than the threshold value 15, the sync signal detection output 16 is output to the decoder 4. In this case, the threshold value 15 is given as 1, and therefore a two-input OR circuit can be used.

The sync signal detection output 16 gives a decode timing to the MTR code decoder 4. As a result, the correct decode operation is realized thereby producing the output data 17.

Now, with reference to FIG. 4, the error patterns generated in the embodiment of FIG. 3 will be explained. In FIG. 4, the column to the extreme left lists error patterns of the data discrimination output 12 in the data discriminator 1 (EEPRML), where x designates an error bit, and 0 a non-error bit. Six patterns x, xx, xxx, x0x, x00x and x000x are shown, of which five patterns other than xxx develop an error. Each error pattern (error event) is defined as an error pattern that can occur between the time when the state transition path in the Viterbi decoder is displaced from the original path by error and the time when it again comes to coincide with (returns to) the correct path.

The leftmost column but one represents the distance of each error pattern code, which is an indication of the degree of likelihood of error occurrence. The smaller the distance, the easier the error occurs.

The third column form the left represents the ratio of error occurrence in the sync pattern used in the embodiment of FIG. 11 described later and the immediately preceding PLO SYNC pattern, or specifically, the ratio of error occurrence in the 128-bit pattern of "10101010101010101010101010101010101010001001000001 01001010101001010101001010101010101010001000000 01001010010001 0101010101010" in the post-code output 13. The 18 bits (underlined portions) from each of the 43rd bit and the 93rd bit of the pattern described above are the sync patterns. Originally, the pattern xxx is most likely to develop an error. Since the selected patterns have no portion where the data inversion is continuous (i.e. the portion where 1 continues such as "11"), however, the EEPRML optimized to the MTR code with the data inversion limited to 3 bits or less prevents the occurrence of the error pattern xxx. Thus, in this case, the occurrence of the error pattern x represents about 90% of all the error patterns. The bit error rate involved (the ratio of error event to the total number of bits reproduced) is 0.0004. Thus, in the range of $10^{-6}$ to $10^{-8}$ where the bit error rate is lowest, for example, the ratio of occurrence of a long error pattern such as x000x is still lowered to a degree negligible. About the same can be said of the sync patterns used in the embodiments of FIGS. 3, 9, 10. Also for the embodiments of FIGS. 9, 10, 11 described later, refer to FIG. 4.

The fourth column from the left indicates each error pattern in the post-code output 13.

The fifth column from the left indicates each error pattern in the (1+D) processing output 18 for data sync signal detection.

The sixth column from the left indicates each error pattern in the (1+D) processing output 18 after being divided into a bit string of odd numbered bits and a bit string of even numbered bits for detecting the data sync signal, i.e. each error pattern in the shift register output 22. The error pattern of x in the data discrimination output 12 indicates that an error (xx) of two continuous bits appears either in the bit string of odd numbered bits or the bit string of even numbered bits in the shift register output 22.

From these facts, it can be understood that the provision of the (1+D) processing unit 5 anew for detecting the data sync signal can remarkably improve the detection rate of the data sync signal 92, because after division into a bit string of odd numbered bits and a bit string of even numbered bits, one of them contains no error even when a 1-bit error (x) representing about 90% of the error patterns occurs.

Figure 17A:
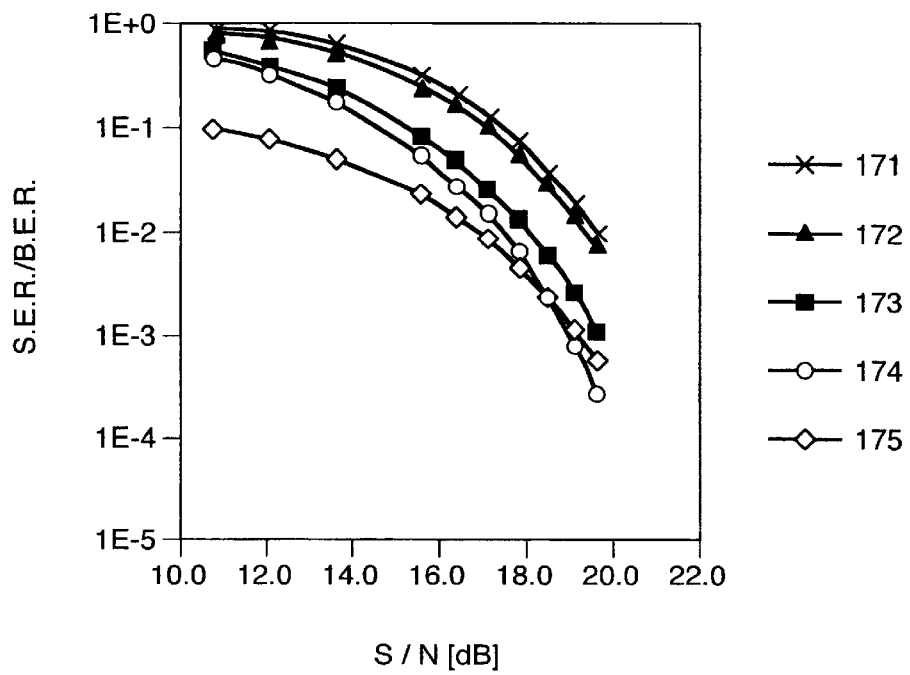
FIGS. 17A and 17B are graphs showing an example characteristic of a data sync signal detector according to the embodiment of FIGS. 3 and 9.
Figure 17B:
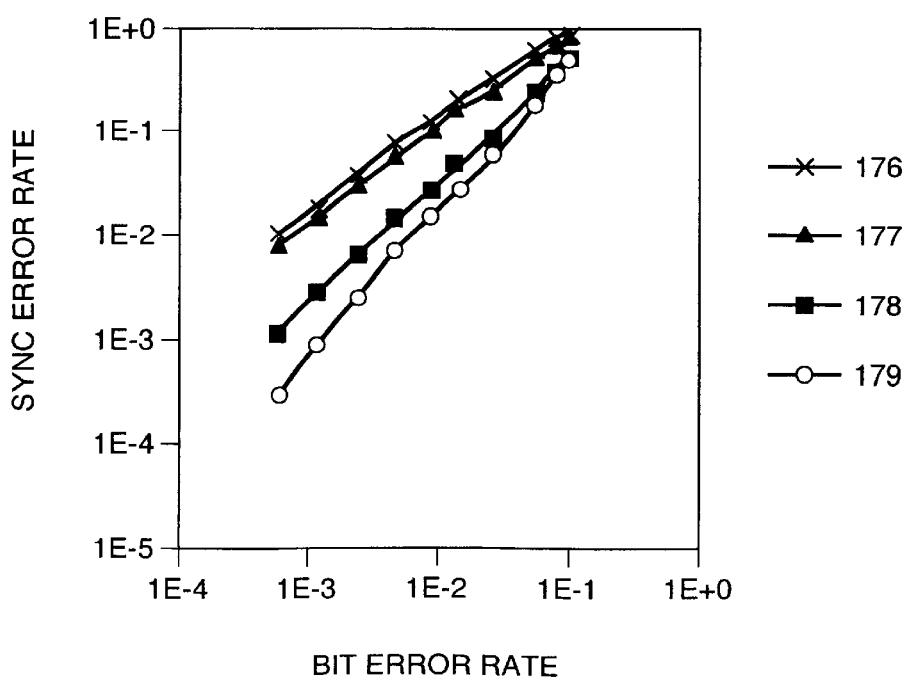

A specific performance will be explained with reference to FIGS. 17A, 17B. FIGS. 17A, 17B are graphs showing the performance of the embodiment of FIG. 3 in computer simulation.

In FIG. 17A, the abscissa represents the signal-to-noise ratio of the input to the Maximum-Likelihood or Viterbi decoder, and the ordinate the bit error rate and the detection error rate of the data sync signal. A characteristic curve 175 represents the bit error rate of the data in the data discrimination output 12. This is the characteristic obtained when the data is regarded as random one. A characteristic curve 171, on the other hand, represents the characteristic of the detection error rate of the data sync signal in the case where process of detecting the data sync signal is executed under the condition that all the 18 bits of the sync pattern are coincident. A characteristic curve 172 represents a method of a reference technique not including the (1+D) processing unit 5 for detection of the data sync signal, which is the characteristic of the detection error rate of the data sync signal in the case where the process of detecting the data sync signal is carried out under the condition that one of the 9-bit patterns divided into a bit string of odd numbered bits and a bit string of even numbered bits is coincident. A characteristic curve 173 represents a characteristic of the detection error rate of the data sync signal in the case where the process for detecting the data sync signal is carried out under the conditions of the embodiment of the invention shown in FIG. 3. It is seen that an improvement of about 2 dB is attained in terms of signal-to-noise ratio as compared with the method of the reference techniques.

In FIG. 17B, the abscissa represents a bit error rate in the data discrimination output 12, and the ordinate the detection error rate of the data sync signal. This graph is the result of replotting the graph of FIG. 17A with the characteristic curve 175 as the abscissa. The characteristic curve 176 corresponds to the characteristic curve 171, the characteristic curve 177 corresponds to the characteristic curve 172, and the characteristic curve 178 corresponds to the characteristic curve 173. Let Be (abscissa) be the rate of occurrence of the error event to the total number of output bits in the output of the data discriminator 1, and Se (ordinate) be the rate of occurrence of the data sync signal detection error to the number of data sync signal detection requests. Then, for the range of Be not more than 0.1, the characteristic curve 178 is approximated by equation (1) below.

$$S_e = 7 B_e^{1.20} \qquad (1)$$

Figure 9:
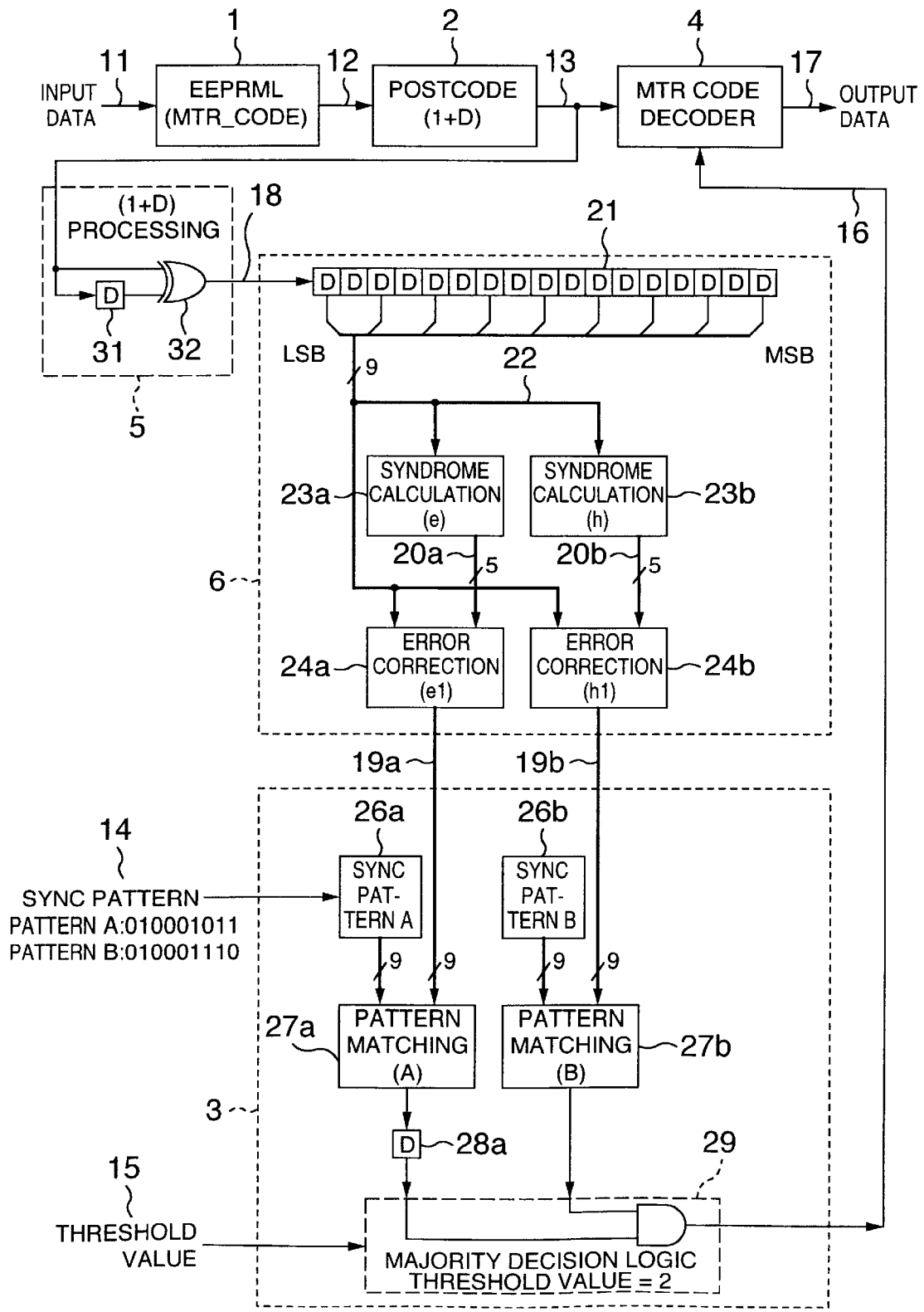
FIG. 9 is a block diagram showing a signal processing apparatus according to a further embodiment of the invention related to the embodiment shown in FIG. 2.

FIG. 9 is a block diagram showing a signal processing apparatus according to another embodiment to which the embodiment of FIG. 2 is applied for decoding of the MTR code.

This embodiment will be explained with reference to FIG. 9.

The configuration of the data discriminator 1, the postcoder 2, the decoder 4 and the (1+D) processing unit 5 in FIG. 9 is similar to that of the embodiment shown in FIG. 3. Also, the same 18-bit pattern is used as in the embodiment of FIG. 3. Thus, the sync pattern of each part up to the (1+D) processing output 18 is also the same.

The (1+D) processing output 18 is input to a shift register 21 in the error detection/correction unit 6. The configuration of the shift register 21 is the same as that of the embodiment shown in FIG. 3. Thus, the sync pattern in the shift register output 22 is given as either of the two 9-bit patterns of "010001011" and "010001110". The shift register output 22 is input to a syndrome calculator 23a, a syndrome calculator 23b, an error corrector 24a and an error corrector 24b.

Figures 6, 7:
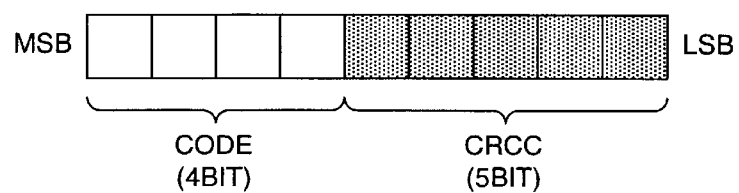
FIG. 6 is a diagram for explaining a configuration of a 9-bit sync pattern used with the embodiment of FIG. 9.
FIG. 7 is a diagram for explaining the relation between an error position and a syndrome value for each error pattern according to the embodiment of FIG. 9.

The 9-bit sync pattern is configured with a 4 bit code and a corresponding 5-bit CRCC (Cyclic Redundancy Check Code) as shown in FIG. 6. The CRCC is the 5-bit remainder after dividing the 4-bit code by a generator polynomial. Thus, in the absence of an error, the remainder of the 9-bit sync pattern divided by the generator polynomial is always zero, while in the presence of an error, the remainder of the 9-bit sync pattern divided by the generator polynomial indicates a corresponding value. The value of this remainder is called the syndrome value. Unless the syndrome value is zero, it indicates an error and the error can be detected. According to this syndrome value, the error position can be detected and the error corrected (1 to 0, or 0 to 1).

Now, consider the sync pattern "010001011" as used herein. The leading four bits "0100" is the original code. The bit string "010000000" obtained by shifting the leading four bits is divided by the polynomial of degree 5 ($X^5+X^4+X^2+1$) and the remainder constitutes the 5 bits "01011" of the CRCC. The remainder after dividing the sync pattern "010001011" by the polynomial of degree 5 ($X^5+X^4+X^{2+1}$) is zero. This generator polynomial corresponds to e in FIG. 5.

The syndrome calculator 23a uses the polynomial of degree 5 ($X^5+X^4+X^2+1$) expressed in e of FIG. 5 as a generator polynomial. In the syndrome calculator 23a, the dividing operation is performed using the generator polynomial ($X1+X^4+X^2+1$), and the remainder thereof is output in five bits as a syndrome value 20a.

Figure 12:
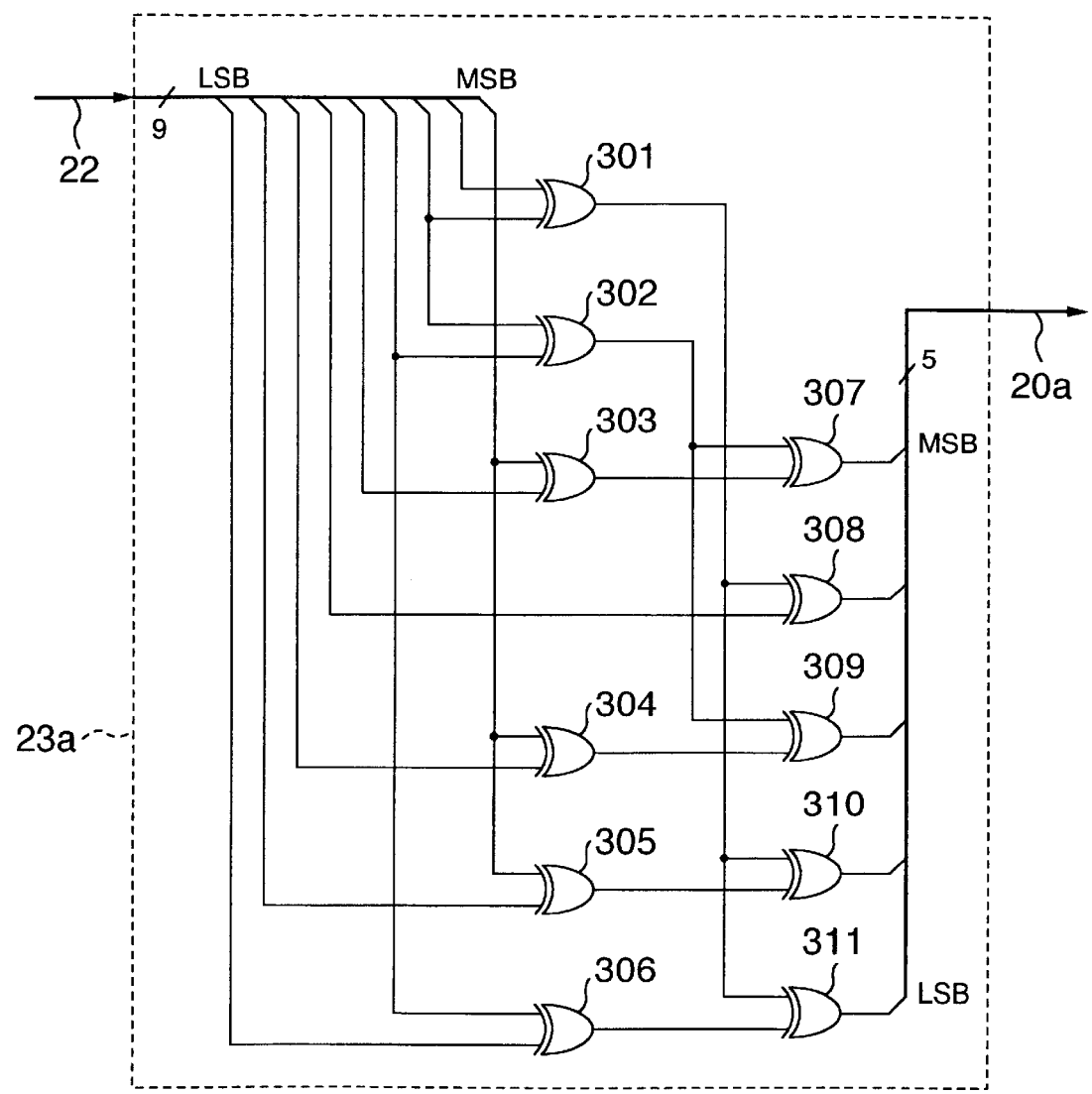
FIG. 12 is a diagram showing an example configuration of a syndrome calculator according to the embodiment shown in FIG. 9.

A detailed example configuration of the syndrome calculator 23a is shown in FIG. 12. In this case, the 9-bit input of the shift register output 22 is divided at a time by the generator polynomial using 11 exclusive OR circuits 301 to 311, and the 5-bit syndrome value 20a is output. This calculation can be made by calculation-by-writing using a mathematic operation. As a result, the syndrome value 20a can be output for each shift register output 22 grouped and output as a bit string of odd numbered bits and a bit string of even numbered bits according to each operation clock not shown.

This is also the case with the syndrome calculator 23b, which can be configured with h($X^5+X^4+X^3+X^2+1$) of FIG. 5 corresponding to the sync pattern "010001110" as a generator polynomial.

Now, the syndrome value 20a for error patterns will be explained with reference to FIG. 7. FIG. 7 shows ten error patterns of one bit or two. These are error patterns of two continuous bits often appearing in the shift register output 22, and at the end of the 9 bit group, constitutes a one-bit pattern. The syndrome value for these ten error patterns, as shown in the column of the polynomial e of FIG. 7 corresponding to the polynomial e of FIG. 5, assumes ten different values of 22, 29, 20, 10, 5, 24, 12, 6, 3 and 1. The polynomials a to h in FIG. 5 correspond to the columns a to h of the generator polynomials a to h of FIG. 7, respectively. Thus, also in the other generator polynomials a to d and f to h, the syndrome values for ten error patterns indicate ten different values, respectively. Therefore, the eight generator polynomials of FIG. 5 are seen to be effective for error detection and correction.

The syndrome value 20a and the syndrome value 20b in FIG. 9 are input to the error corrector 24a and the error corrector 24b, respectively. The corresponding error in the shift register output 22 is corrected by the syndrome value 20a in the error corrector. 24a and by the syndrome value 20b in the error corrector 24b. The process for detecting an error corresponding to the generator polynomial ($X^5+X^4+X^2+1$) in e of FIG. 5 and an error corresponding to the generator polynomial ($X^5+X^4+X^3+X^2+1$) in h of FIG. 5 is executed and, upon detection of the error, a corresponding correction is carried out. The result is output as an error detection/correction output 19a and an error detection/correction output 19b, respectively.

Figure 13:
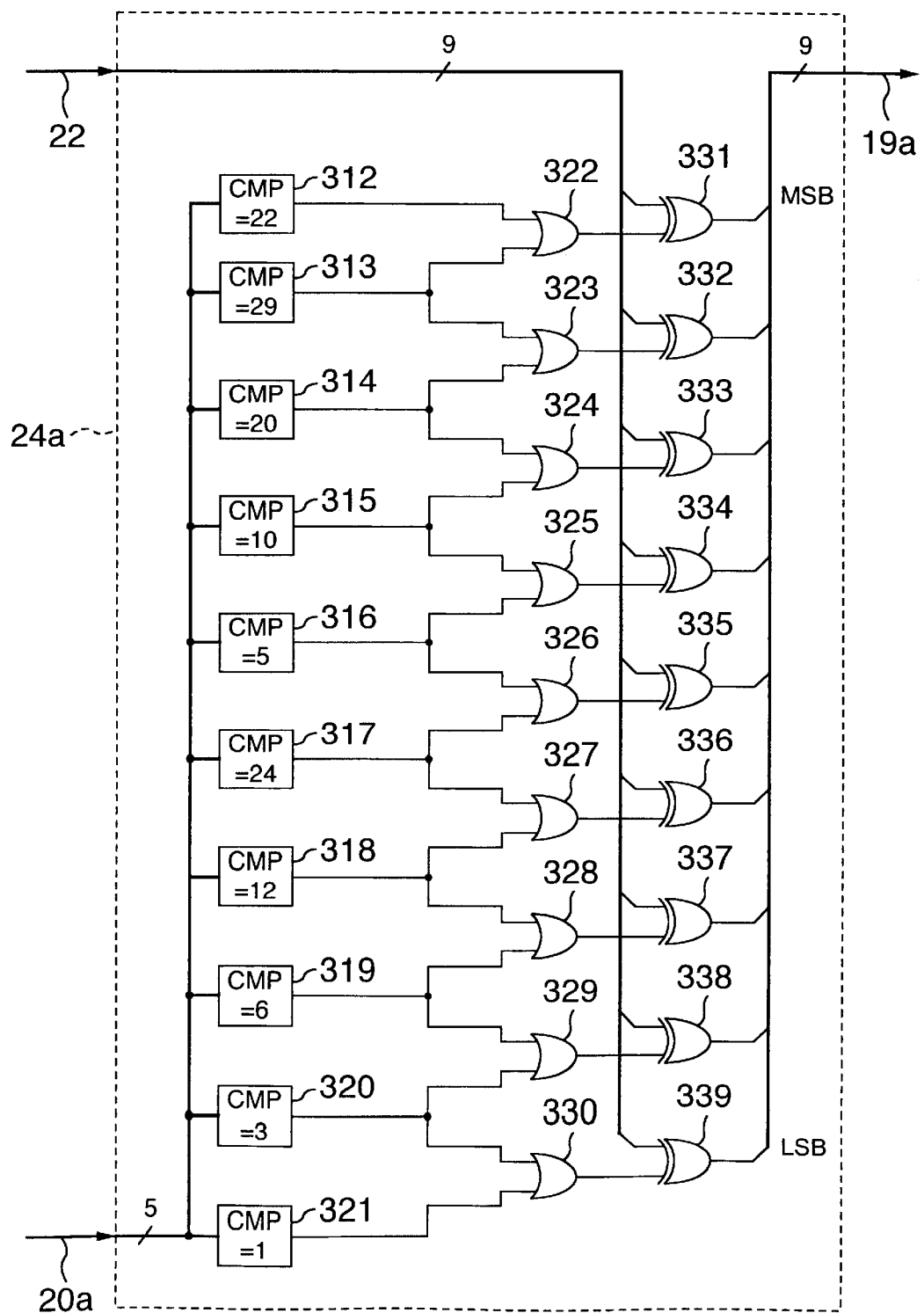
FIG. 13 is a diagram showing an example configuration of an error correction circuit according to the embodiment of FIG. 9.

An example of a more detailed configuration of the error correction unit 24a is shown in FIG. 13. The syndrome value 20a is compared with ten values of 22, 29, 20, 10, 5, 24, 12, 6, 3, 1 by comparators 312 to 321. Upon coincidence by any comparator in the presence of an error, the result is applied to a corresponding circuit of the exclusive OR circuits 331 to 339 through a corresponding circuit of the OR circuits 322 to 330. The exclusive OR circuits 331 to 339 are supplied with the information on the error position and the shift register output 22. Thus, the bit associated with the error is inverted, and the error is corrected. The result is output as an error detection/correction output 19a.

Consider the error correcting operation in more detail. Assume, for example, that the leading two bits of the sync pattern "010001011" are erroneous and the value "100001011" appears in the shift register output 22. The error is that of the error pattern 2 in FIG. 7. The syndrome value 20a involved is 29 from FIG. 7. In FIG. 13, the result of comparison in the comparator 313 coincides and 1 (true value) is output. This value is input to the OR circuit 322 and the OR circuit 323, the output of which also assumes 1 (true value). As a result, one of the input terminals of the exclusive OR circuits 331, 332 is supplied with 1. Thus, the two bits on the MSB side (corresponding to the head of the sync pattern) of the shift register output 22 are inverted, so that "100001011" is corrected to "010001011". This pattern corrected is output as an error detection/correction output 19a.

The error detection/correction outputs 19a, 19b are applied to the pattern matching units 27a, 27b of the data sync signal detector 3, and matched against the sync patterns of the sync pattern holders 26a, 26b, respectively. Each sync pattern is given as a sync pattern 14, so that the sync pattern holder 26a holds a 9-bit pattern "010001011", and the sync pattern holder 26b a 9-bit pattern "010001110". For setting the timing of the outputs of the pattern matching units 27a, 27b in order, the output of the pattern matching unit 27a is delayed through the unit time delay circuit 28a and then applied to the majority decision logic circuit 29.

In the majority decision logic circuit 29, the number of coincidences between two patterns is compared with the threshold value 15, and in the case where the number of coincidences of the pattern matching is not less than the threshold value 15, the sync signal detection output 16 is produced. In the case under consideration, the threshold value 15 is 2, and therefore a 2-input AND circuit can be used. When an error is detected and corrected by the error detection/correction unit 6, the fact that the data starting position is unknown increases the possibility of correcting the sync pattern erroneously. Thus the threshold value is required to be 2 or more.

The sync signal detection output 16 gives the decode timing to the decoder 4 of the MTR code. As a result, the correct decoding is realized and the output data 17 is obtained.

Now, the performance of the embodiment shown in FIG. 9 will be described again with reference to FIG. 4. In the embodiment of FIG. 3, the error pattern x could be saved. In the embodiment of FIG. 9, however, a continuous 2-bit error can be detected and corrected, and therefore, the error patterns xx, xOOx can also be saved. In other words, it can be understood that by providing the (1+D) processing unit 5 and detecting and correcting the continuous 2-bit error after division into a bit string of odd numbered bits and a bit string of even numbered bits, about 98.8% of the errors occurred can be saved and the detection rate of the data sync signal 92 can be improved further.

This performance will be explained with reference to FIGS. 17A, 17B partially used for reference above. Characteristic curves 174, 179 represent the data sync signal detection error rate in the case where the data sync signal s detected under the conditions of the embodiment shown in FIG. 9. From FIG. 17A, it is seen that an improvement of about 0.5 dB can be attained in terms of the signal-to-noise ratio of the Viterbi decoder input as compared with the embodiment of FIG. 3. Also, let Be (abscissa) be the ratio of occurrence of an error event to the total number of output bits of the data discriminator 1 and Se (ordinate) be the ratio of occurrence of the data sync signal detection error to the number of requests for data sync signal detection. The characteristic curve 179 for Be in the range of 0.1 or less is approximated by equation (2) below.

$$S_e = 12 B_e^{1.42} \quad (2)$$

Figure 10:
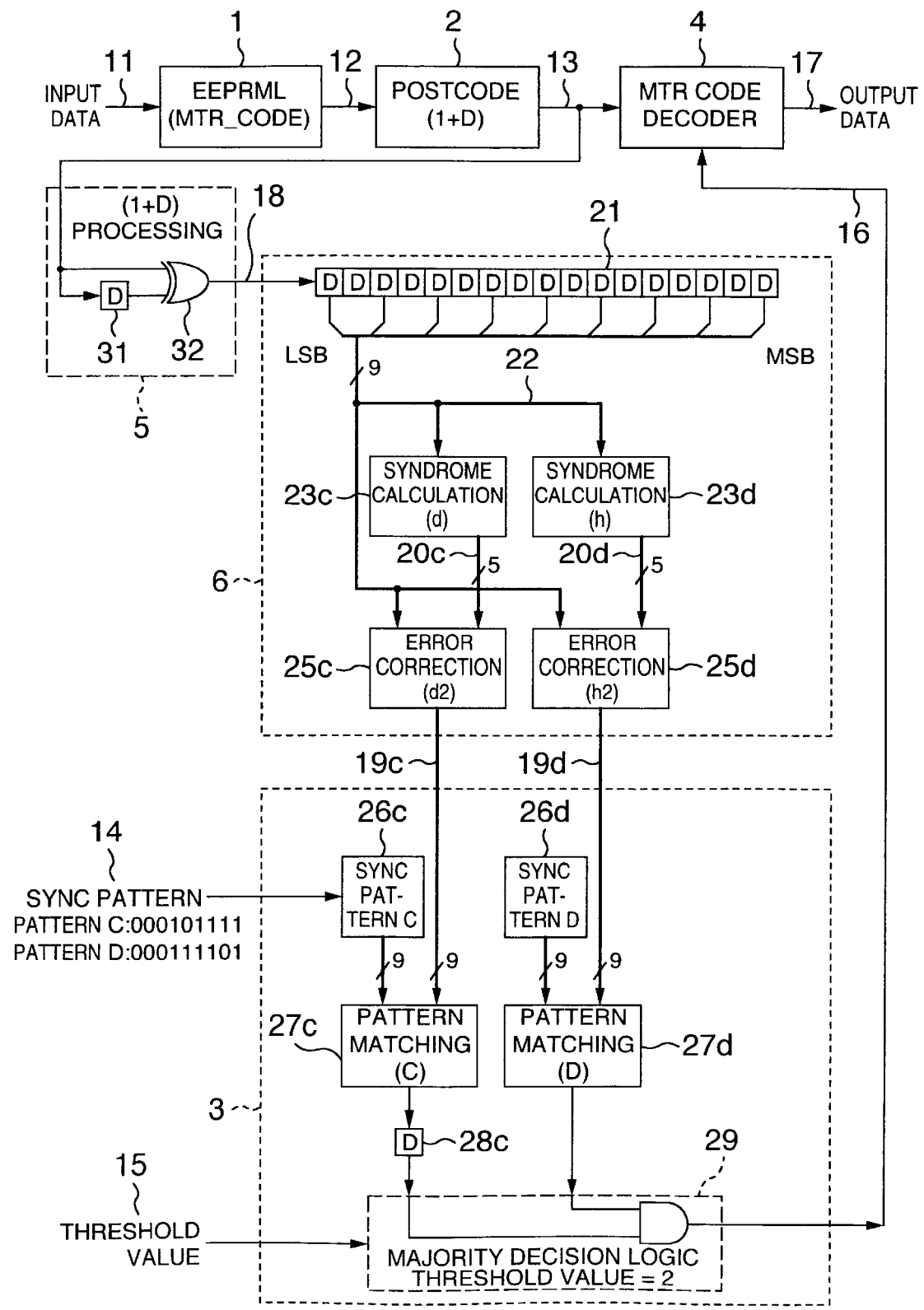
FIG. 10 is a block diagram showing a signal processing apparatus according to a still further embodiment of the invention related to the embodiment shown in FIG. 2.

A signal processing apparatus according to still another embodiment of the invention will be explained with reference to FIG. 10. The basic configuration of FIG. 10 is the same as that of the embodiment shown in FIG. 9. Only the difference will be described in detail. The difference lies in a sync pattern 14, an error detection/correction unit 6 and generator polynomials used for them.

The sync pattern used in this case is an 18 bit pattern "000000100101010010" in the post code output 13. In the (1+D) processing output 18, on the other hand, an 18-bit pattern "000000110111111011" is involved. In the shift register output 22, the patterns are "000101111" and "000111101". The generator polynomials for error detection and correction of these patterns are given as d($X^5+X^3+X^2+X^{1+1}$) and h($X^5+X^4+X^3+X^2+1$) shown in FIG. 5.

The syndrome calculators 23c, 23d can be configured with an exclusive OR circuit as in the embodiment shown in FIG. 9. The syndrome calculator 23c corresponds to the generator polynomial ($X^5+X^3+X^2+X^1+1$), and the syndrome calculator 23d corresponds to the generator polynomial ($X^5+X^4+X^3+X^2+1$).

Now, the syndrome value 20c for error patterns will be explained with reference to FIG. 8. FIG. 8 shows 19 error patterns of 1 bit or two. These are error patterns which appear in the shift register output 22, and include a 2-bit continuous error pattern which frequently appears as explained in the embodiment of FIG. 9 and becomes a one-bit error pattern occurring at the end of the 9-bit group. Next frequently appearing is the xOx error pattern which becomes one-bit error pattern at the second bit from the end of the 9-bit group. For these 19 error patterns, there are 19 different syndrome values of 9, 26, 13, 17, 31, 24, 12, 6, 3, 1, 19, 23, 28, 14, 7, 20, 10, 5 and 2 as shown in the column of the generator polynomials d of FIG. 8 corresponding to the polynomials d of FIG. 5. Also, for another generator polynomials h, the syndrome values for 19 error patterns assume 19 different values in similar fashion. It is seen therefore that two generator polynomials d and h in FIG. 5 are effective for two types of error detection and correction.

The syndrome values 20c, 20d of FIG. 10 are input to the error correction units 25c, 25d, respectively. The corresponding error of the shift register output 22 is corrected by the syndrome value 20c in the error correction unit 25c, and by the syndrome value 20d in the error correction unit 25d. In respective cases, the error detection is carried out in a way corresponding to the generator polynomial ($X^5+X^3+X^2+X^{1+1}$) in d of FIG. 5, and corresponding to the polynomial ($X^5+X^4+X^3+X^2+1$) in h of FIG. 5. Upon detection of an error, the corresponding correction is carried out. The result is output as an error detection/correction outputs 19c and 19d.

Figure 14:
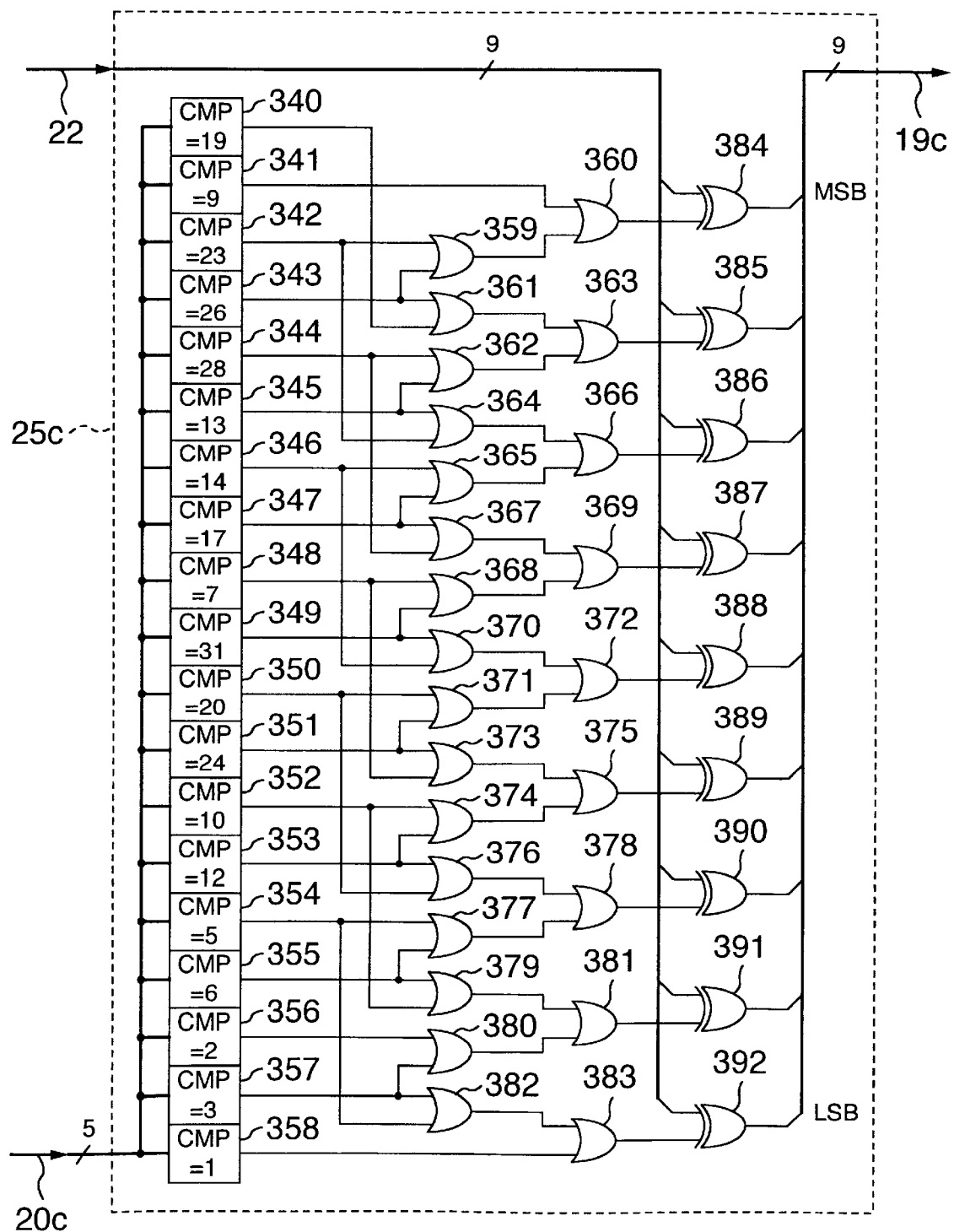
FIG. 14 is a diagram showing an example configuration of an error correction circuit according to the embodiment of FIG. 10.

An example configuration of the error correction unit 25c is shown in detail in FIG. 14. The syndrome value 20c is compared with 19 values including 19, 9, 23, 26, 28, 13, 14, 17, 7, 31, 20, 24, 10, 12, 5, 6, 2, 3 and 1 by comparators 340 to 358. In the case where the output of any one of the comparators is coincident in the presence of an error, the result is applied to the corresponding one of the exclusive OR circuits 384 to 392 through the OR circuits 359 to 383. The exclusive OR circuits 384 to 392 are supplied with the error position information and the shift register output 22, and therefore, the bit associated with the error is inverted thereby to correct the error. The result is output as an error detection/correction output 19c.

Consider the error correction operation in more detail. Assume, for example, that the 2nd and 4th bits from the head of the sync pattern "000101111" are erroneous so that the value "010001111" has appeared as the shift register output 22. The error is that of the error pattern 13 in FIG. 8. In this case, the syndrome value 20c is 28 as seen from FIG. 8. At the same time, in FIG. 14, the result of comparison in the comparator 344 is coincident, and 1 (true value) is output. This value is applied to the OR circuits 362, 367. Further, the signal is output through the OR circuits 363, 369, so that the output also assumes 1 (true value). As a result, 1 is input to one of the input terminals of the exclusive OR circuits 385, 387, and therefore the 2nd and 4th bits from the MSB side (corresponding to the head of the sync pattern) of the shift register output 22 are inverted. Thus, the pattern "010001111" is corrected to "000101111". The pattern thus corrected is output as an error detection/correction output 19c.

The error detection/correction outputs 19c, 19d are input to the pattern matching units 27c, 27d of the data sync signal detector 3, and compared with the sync patterns of the sync pattern holders 26c, 26d, respectively. Each sync pattern is given as a sync pattern 14, so that the sync pattern holder 26c holds the 9-bit pattern "000101111" and the sync pattern holder 26d holds the 9-bit pattern "000111101". In order to set the outputs of the pattern matching units 26c, 26d in the same timing, the output of the pattern matching unit 27c is delayed through the unit time delay line 28c and input to the majority decision logic circuit 29.

In the majority decision logic circuit 29, the number of coincidences in the result of the comparison between the two patterns obtained is compared with the threshold value 15.

In the case where the number of coincidences as a result of pattern matching is not less than the value given by the threshold level 15, the sync signal detection output 16 is output. In this case, too, like in the embodiment of FIG. 9, 2 is given as the threshold value 15, and therefore a two-input AND circuit can be used for this purpose.

The sync signal detection output 16 gives the decode timing of the decoder 4 of the MTR code. As a result, the correct decoding is realized, thereby producing the output data 17.

Once again, the performance of the embodiment shown in FIG. 10 is described with reference to FIG. 4. In the embodiment of FIG. 9, the error pattern x, the error pattern xx and the error pattern xOOx can be saved. In the embodiment of FIG. 10, on the other hand, it is seen that the error pattern xOx can also be saved. Specifically, by inserting the (1+D) processing unit 5 and by detecting and correcting a 2-bit continuous error and a 3-bit continues error of xOx after division into a bit string of odd numbered bits and a bit string of even numbered bits, it is understood that about 99.9% of the errors occurred can be saved, and the detection rate of the data sync signal 92 is further improved.

Figure 18A:
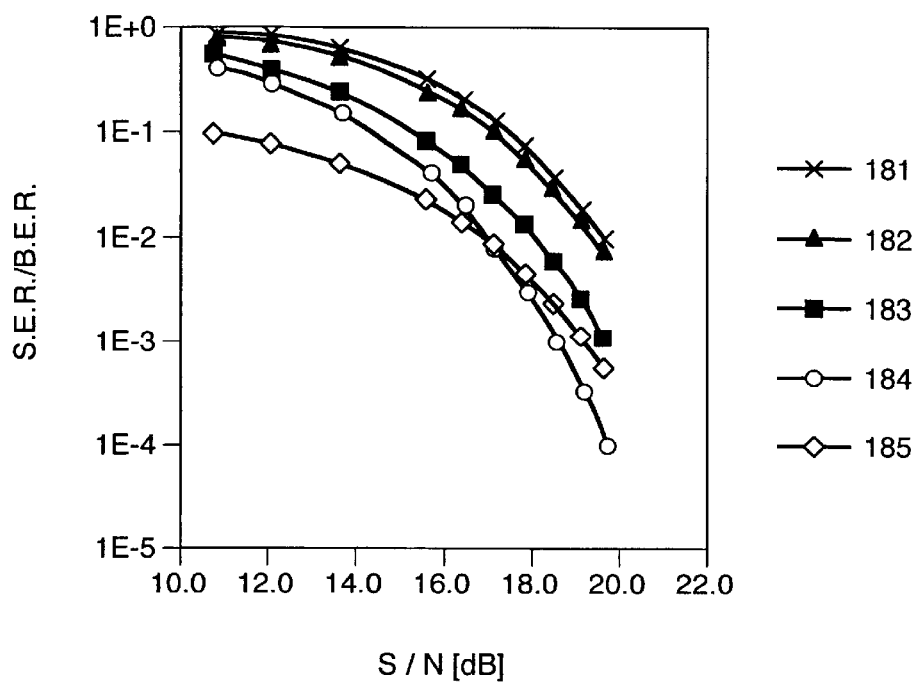
FIGS. 18A and 18B are graphs showing an example characteristic of a data sync signal detector according to the embodiment of FIG. 10.
Figure 18B:
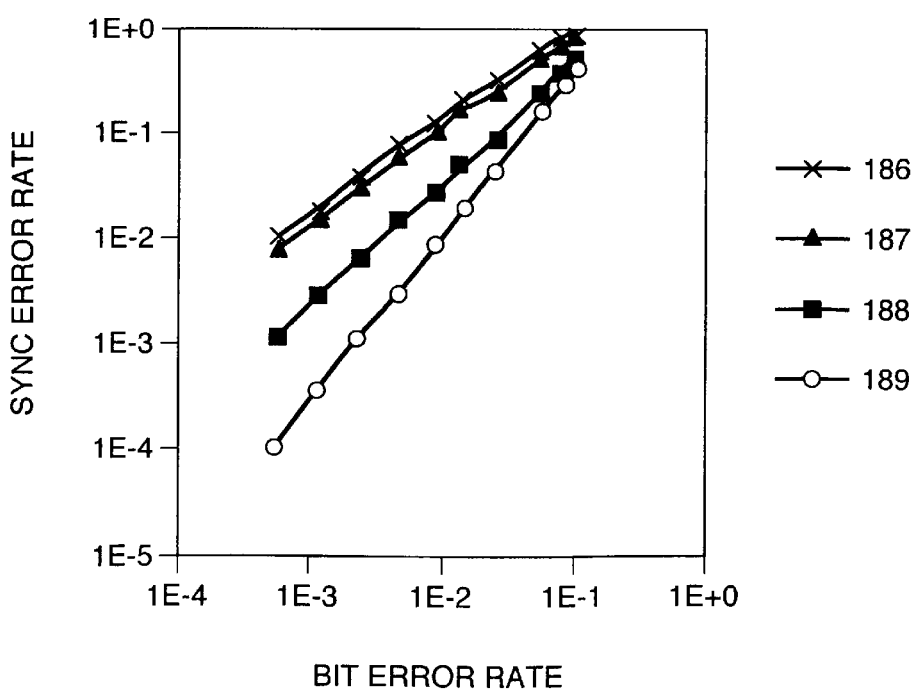

This performance will be explained with reference to FIGS. 18A, 18B. FIGS. 18A, 18B are graphs mainly indicating the performance of the embodiment of FIG. 10, prepared by computer simulation.

In FIG. 18A, the abscissa represents the signal-to-noise ratio in the Viterbi decoder input, and the ordinate the bit error rate and the data sync signal detection error rate. A characteristic curve 185 indicates the bit error rate of the data in the data discrimination output 12. This is a characteristic obtained when the data are regarded to be random. A characteristic curve 181 indicates the characteristic of the data sync signal detection error rate in the case where the data sync signal is detected under the condition that all the 18 bits of the sync pattern are coincident. A characteristic curve 182 is based on a method using a reference technique not including the (1+D) processing unit for data sync signal detection, and represents a characteristic of the data sync signal detection error rate in the case where the data sync signal detection is carried out under the condition that any one of the 9-bit patterns of the bit string of odd numbered bits and the bit string of even numbered bits are coincident. A characteristic curve 183 represents the characteristic of the data sync signal detection error obtained in the case where the data sync signal detection is carried out under the condition ((1+D) processing unit 5 is included, and the error detection/correction is not effected) of the embodiment of the invention shown in FIG. 3. A characteristic curve 184 represents the characteristic of the data sync signal detection error obtained in the case where the data sync signal detection is carried out under the condition of the embodiment of the invention shown in FIG. 10. From FIG. 18A, it is seen that the signal-to-noise ratio is improved by about 1 dB in the input of the Viterbi decoder as compared with the embodiment of FIG. 3. This is seen to be an improvement of about 0.5 dB in the signal-to-noise ratio as compared with the embodiment of FIG. 9.

In FIG. 18B, the abscissa represents the bit error rate in the data discrimination output 12, and the ordinate represents the data sync signal detection error rate. This is the graph of FIG. 18A replotted with the characteristic curve 185 used as the abscissa. A characteristic curve 186 corresponds to the characteristic curve 181, a characteristic curve 187 corresponds to the characteristic curve 182, a characteristic curve 188 corresponds to the characteristic curve 183 and a characteristic curve 189 corresponds to the characteristic curve 184. Let Be (abscissa) be the ratio of occurrence of an error event to the total number of output bits in the output of the data discriminator 1, and Se (ordinate) be the ratio of occurrence of a data sync signal detection error to the number of requests for data sync signal detection. The characteristic curve 189 for the value of Be in the $$S_e = 20 B_e^{1.64} \qquad (3)$$

A signal processing apparatus according to a further embodiment of the invention will be explained with reference to FIG. 11. The basic configuration of FIG. 11 is the same as that of the embodiment shown in FIG. 9. What is different is that four 9-bit patterns are used as a sync pattern 14. A method of detecting and correcting an error is also the same as that of the embodiment shown in FIG. 9, and each sync pattern corresponds to ten error patterns for correction.

The sync patterns used in this embodiment include an 18-bit pattern of "100010010000010100" and an 18-bit pattern of "001000000010010100" in the post-code output 13, and a total of 36-bit patterns are matched. Further, a 32-bit pattern of "10101010101010101010101010101010" for prevention of error propagation is inserted between the aforementioned two bit patterns. In the (1+D) processing output 18, these patterns are represented as "110011011000011110", "001100000011011110" and "111111111111111111111111111111111", respectively. The patterns matched in the shift register output 22 include "101010011", "101100110", "010001011" and "010001110". The generator polynomials for error detection and correction of these patterns are given as $f(X^5+X^4+X^2+X^1+1)$, $h(X^5+X^4+X^3+X^2+1)$ $e(X^5+X^4+X^2+1)$ and $h(X^5+X^4+X^3+X^2+1)$, respectively.

The syndrome calculators 23e to 23h can be configured with exclusive OR circuits as in the embodiment of FIG. 9. The syndrome calculator 23e corresponds to the generator polynomial $(X^5+X^4+X^2+X^1+1)$, the syndrome calculator 23f corresponds to the polynomial $(X^5+X^4+X^3+X^2+1)$, the syndrome calculator 23g corresponds to the polynomial $(X^5+X^4+X^2+1)$, and the syndrome calculator 23h corresponds to the polynomial $(X^5+X^4+X^3+X^2+1)$. The syndrome calculators 23f and 23h are for calculating the same generating polynomials, and therefore can alternatively be replaced by a single common syndrome calculator.

The syndrome value for ten error patterns for each pattern matched is the value of the corresponding polynomial in the syndrome value column in FIG. 7. Specifically, the syndrome value 20e is given in the column of the generator polynomial f, the syndrome value 20f is given in the column of the generator polynomial h, the syndrome value 20g is given in the column of the generator polynomial e, and the syndrome value 20h is given in the column of the generator polynomial h.

Figure 11:
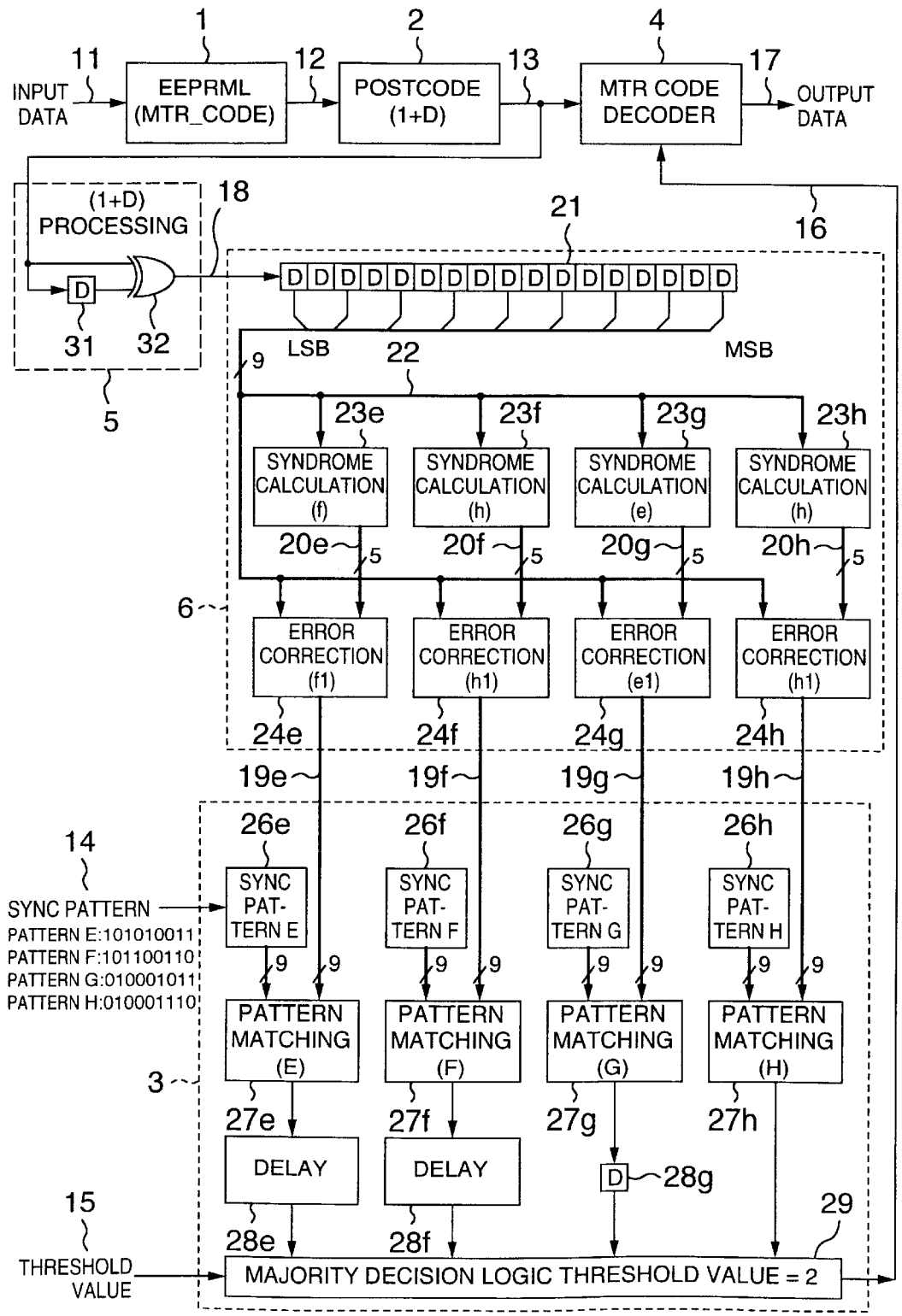
FIG. 11 is a block diagram showing a signal processing apparatus according to a yet further embodiment of the invention related to the embodiment shown in FIG. 2.

The syndrome values 20e to 20h in FIG. 11 are input to the error correction units 24e to 24h, respectively. The corresponding error in the shift register output 22 is corrected by the syndrome value 20e in the error correction unit 24e, by the syndrome value 20f in the error correction unit 24f, by the syndrome value 20g in the error correction unit 24g, and by the syndrome value 20h in the error correction unit 24h. In the respective cases, the error detection is carried out in a manner corresponding to the generator polynomial $(X^5+X^4+X^2+X^{1+1})$ in f of FIG. 5, the generator polynomial $(X^5+X^4+X^3+X^2+1)$ in h of FIG. 5, the generator polynomial $(X^5+X^4+X^2+1)$ in e of FIG. 5, and the generator polynomial $(X^5+X^4+X^3+X^2+1)$ in h of FIG. 5. Upon detection of an error, the corresponding correction is carried out. The result is output as error detection/correction outputs 19e to 19h. A detailed configuration of the error correction units 24e to 24h is realized in a similar form to FIG. 13. In this case, too, the error correction units 24f and 24h which perform a similar processing can alternatively be replaced by a single common error correction unit.

The error detection/correction outputs 19e to 19h are input to the pattern matching units 27e to 27h, respectively, of the data sync signal detector 3, and matched against the sync patterns of the sync pattern holders 26e to 26h, respectively. Each sync pattern is given as the sync pattern 14, so that the sync pattern holder 26e holds a 9-bit pattern "101010011", the sync pattern holder 26f a 9-bit pattern "101100110", the sync pattern holder 26g a 9-bit pattern "010001011", and the sync pattern holder 26h a 9-bit pattern "010001110". In order to set the output timing of the pattern matching units 27e to 27h in order, the output of the pattern matching 27e is delayed by 51T (1T is a unit time) by the delay cell 28e, the output of the pattern matching 27f by 5OT by the delay cell 28f, and the output of the pattern matching 27g by 1T by the unit time delay cell 28g. The result of each delay is input to the majority decision logic circuit 29.

The majority decision logic circuit 29 compares the number of coincidences of the four pattern matching results with the threshold value 15, and in the case where the number of coincidences of the pattern matching result is not less than the figure of the threshold value 15, a sync signal detection output 16 is output. In this case, too, the threshold value 15 is set to 2 as in the embodiment of FIG. 9.

The sync signal detection output 16 gives the decode timing for the MTR code decoder 4. As a result, a correct decoding is realized and the output data 17 is obtained.

The performance for the embodiment of FIG. 11 will be explained. In the embodiment shown in FIG. 9, the detection cannot be carried out upon occurrence of a single error pattern xOx or xOOOx. In the configuration under consideration, however, the data signal detection of two or less errors of whatever type is possible for all the error patterns shown in FIG. 4. If only the error pattern x occurs, for example, the data sync signal can be detected against five or less errors. Thus, it can be understood that the detection rate of the data sync signal 92 is remarkably improved.

Figure 19A:
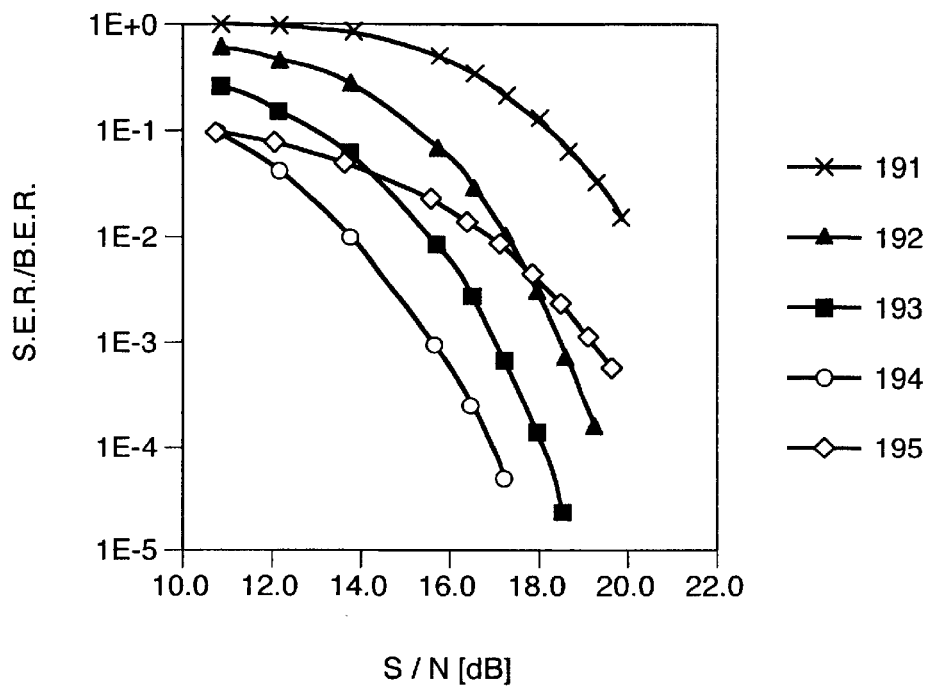
FIGS. 19A and 19B are graphs showing an example characteristic of a data sync signal detector according to the embodiment of FIG. 11.
Figure 19B:
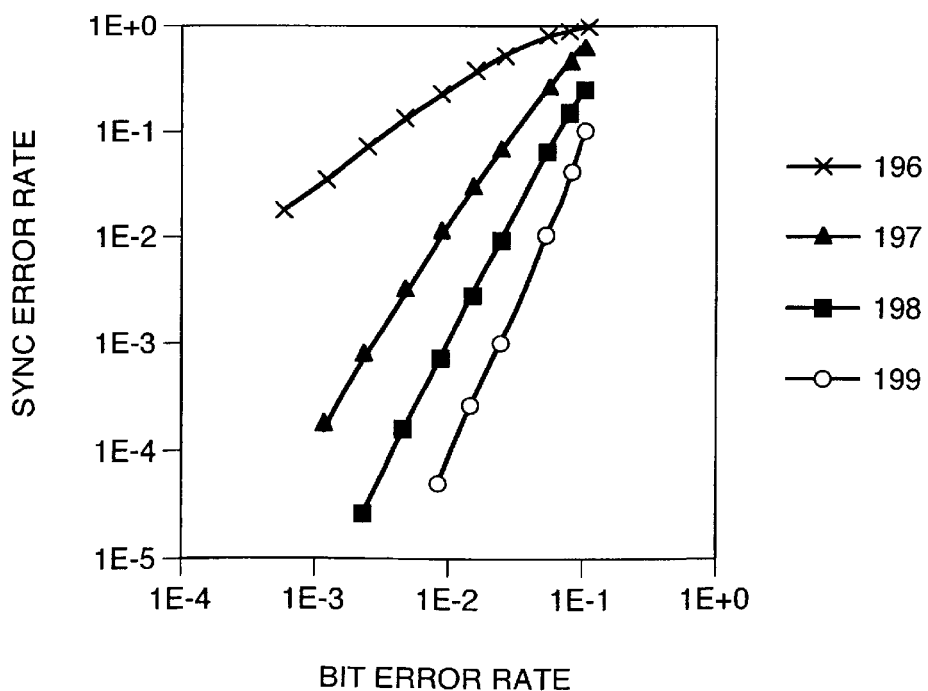
Figure 20:
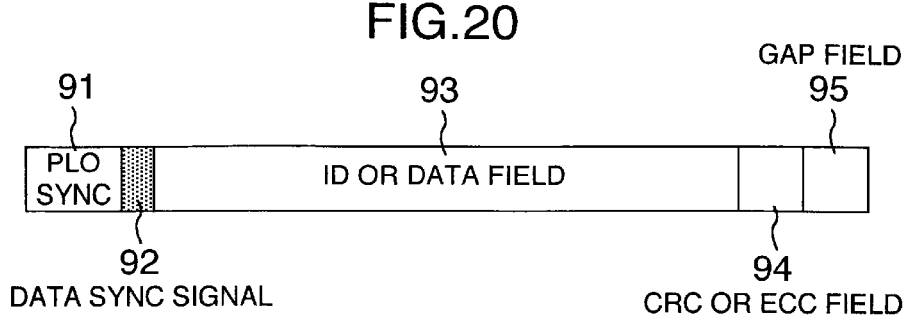
FIG. 20 is a diagram for explaining an example format of the recording data in a magnetic disk device.
Figure 21:
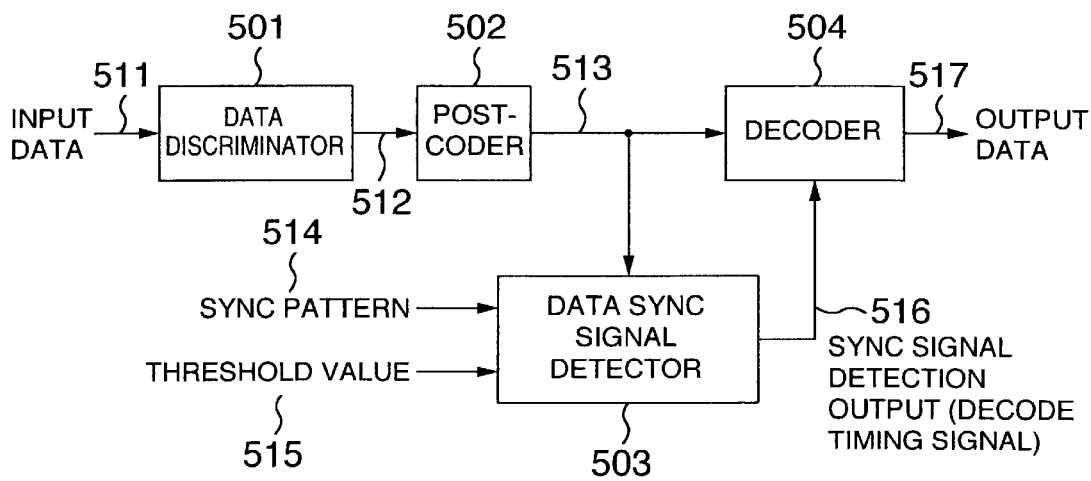
FIG. 21 is a block diagram showing a configuration of a signal processing apparatus useful for explaining the present invention.

The performance will be explained with reference to FIGS. 19A, 19B. FIGS. 19A, 19B are graphs showing the performance of the embodiment of FIG. 11 as determined by computer simulation.

In FIG. 19A, the abscissa represents the signal-to-noise ratio of the Viterbi decoder input and the ordinate the bit error rate and the data sync signal detection error rate. A characteristic curve 195 represents the bit error rate of the data in the data discrimination output 12. This a characteristic obtained when the data are considered to be random. A characteristic curve 191 represents the characteristic of the data sync signal detection error rate when the data sync signal detection is carried out under the condition that all the 36 bits of the sync pattern coincide. As compared with the characteristic curve 171 of FIG. 17A or the characteristic curve 181 of FIG. 18A, it is seen that the detection performance is deteriorated somewhat by an amount equivalent to the increase in the number of bits of the matching pattern. A characteristic curve 192 is based on a method of a reference technique not including the (1+D) processing unit 5 for data sync signal detection, and represents the characteristic of the data sync signal detection error rate in the case where the data sync signal detection is carried out under the condition that any one of the four 9-bit patterns separated into a bit string of odd numbered bits and a bit string of even numbered bits is coincident. A characteristic curve 193, on the other hand, represents a characteristic of the data sync signal detection error rate in the case where the data sync signal detection is carried out under the condition (the (1+D) processor 5 is included, and no error is detected or corrected) of the embodiment of FIG. 3. A characteristic curve 194 represents the characteristic of the data sync signal detection error rate in the case where the data sync signal is detected under the condition of the embodiment of FIG. 11 according to the invention. From FIG. 19A, it is seen that the signal-to-noise ratio is improved by about two or three dB as compared with the configuration of the reference technique.

In FIG. 19B, the abscissa represents the bit error rate in the data discrimination output 12, and the ordinate represents the data sync signal detection error rate. This is the result of replotting the graph of FIG. 19A with the characteristic curve 195 as an abscissa. A characteristic curve 196 corresponds to the characteristic curve 191, a characteristic curve 197 corresponds to the characteristic curve 192, a characteristic curve 198 corresponds to the characteristic curve 193, and a characteristic curve 199 corresponds to the characteristic curve 194. Let Be (abscissa) be the ratio of occurrence of an error event to the total number of output bits in the output of the data discriminator 1, and let Se (ordinate) be the rate of occurrence of the data sync signal detection error to the number of requests for data sync signal detection. The characteristic curve 198 for Be in the range of 0.1 or less is approximated by equation (4), and the characteristic curve 199 for Be in the range of 0.1 or less is approximated by equation (5).

$$S_e = 90 Be^{2.51} \quad (4)$$

$$S_e = 160 Be^{3.15} \quad (5)$$

As explained in the embodiments of FIGS. 3, 9, 10, 11, the pattern used as a sync pattern is required to have the remainder of zero in the dividing operation by the generator polynomial shown in FIG. 4, and these operations are required to make no error of easily employing other patterns. Such 9-bit patterns are listed in FIG. 16. In this case, 44 types of patterns are available. The patterns used in the embodiments of FIGS. 3 and 9 are Nos. 15 and 17 in FIG. 16, the patterns used in the embodiment of FIG. 10 are Nos. 3 and 7 in FIG. 16, and the patterns used in the embodiments of FIG. 11 are Nos. 15, 17, 33 and 37 in FIG. 16.

When an attempt is made to realize the data sync detector in the signal processing apparatus according to the invention with an integrated circuit, the circuit size, when a 2-input NAND gate is converted as one gate, increases about 10 gates for the embodiment of FIG. 3, about 200 gates for the embodiment shown in FIG. 9, about 350 gates for the embodiment shown in FIG. 10, and about 400 gates for the embodiment shown in FIG. 11, as compared with the reference technique. This is easily realizable taking the recent progress of the integrated circuit technology into account.

The data sync signal detector according to the invention can also be configured and realized in software as described later.

As described above, with the signal processing apparatus according to the invention, the (1+D) processing is executed before detection of the data sync signal, and further the bits are divided into a bit string of odd numbered bits and a bit string of even numbered bits. In this way, the types of error patterns can be reduced and the error pattern length shortened. As a result, the error detection and correction is facilitated, thereby making possible more accurate data sync signal detection.

As shown in FIGS. 17A, 17B, 18A, 18B, 19A, 19B, the method of detecting the data sync signal for the signal processing apparatus according to the invention, as compared with the method of the reference technique, has an effect of improving the signal-to-noise ratio in the input of the Maximum-Likelihood or Viterbi decoder by about 2 to 3 dB. Thus, it is possible to obtain data sync information with high accuracy. Also, the data error caused by the error of the data sync information of the signal processing circuit, the information recording/reproduction apparatus or the information transmission system using the data sync information can be reduced.

Now, a further embodiment of the invention will be explained with reference to FIG. 22.

Figure 22:
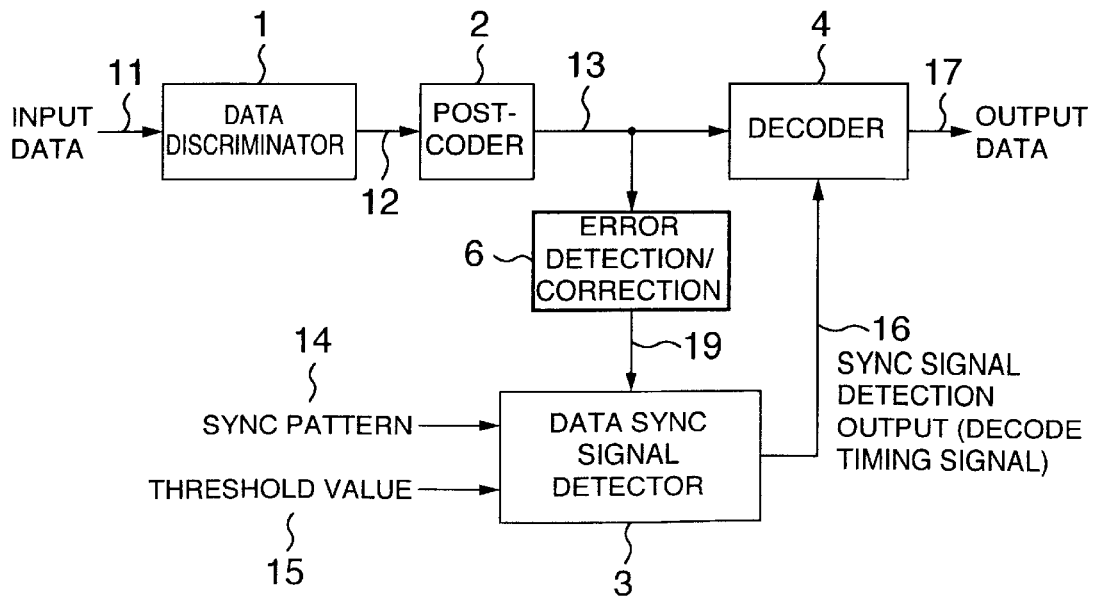
FIG. 22 is a block diagram showing a signal processing apparatus according to still another embodiment of the invention.

In FIG. 22, input data 11 are input to a data discriminator 1, and a data discrimination output 12 providing a code bit output discriminated by the data discriminator 1 is input to a post-coder 2 and subjected to a predetermined post-code processing. Further, the output 13 of the post-coder 2 is input to a decoder 4 and an error detection/correction unit 6. The error detection/correction unit 6 detects and corrects an error of bit strings grouped in one or more groups of bit string according to a predetermined method. The output 19 thus corrected in error is input to a data sync signal detector 3, matched against a sync pattern 14. In the case where the number of pattern coincidences is not less than the threshold value 15, a sync signal detection output 16 is output. The sync signal detection output 16 is input to the decoder 4, and gives a decode timing of the code string in the post-code output 13. Thus, the demodulated output data 17 is produced from the decoder 4.

An error of the data sync signal is detected and corrected before data sync signal detection and therefore the data sync signal can be accurately detected.

A yet further embodiment of the invention will be explained with reference to FIG. 23.

Figure 23:
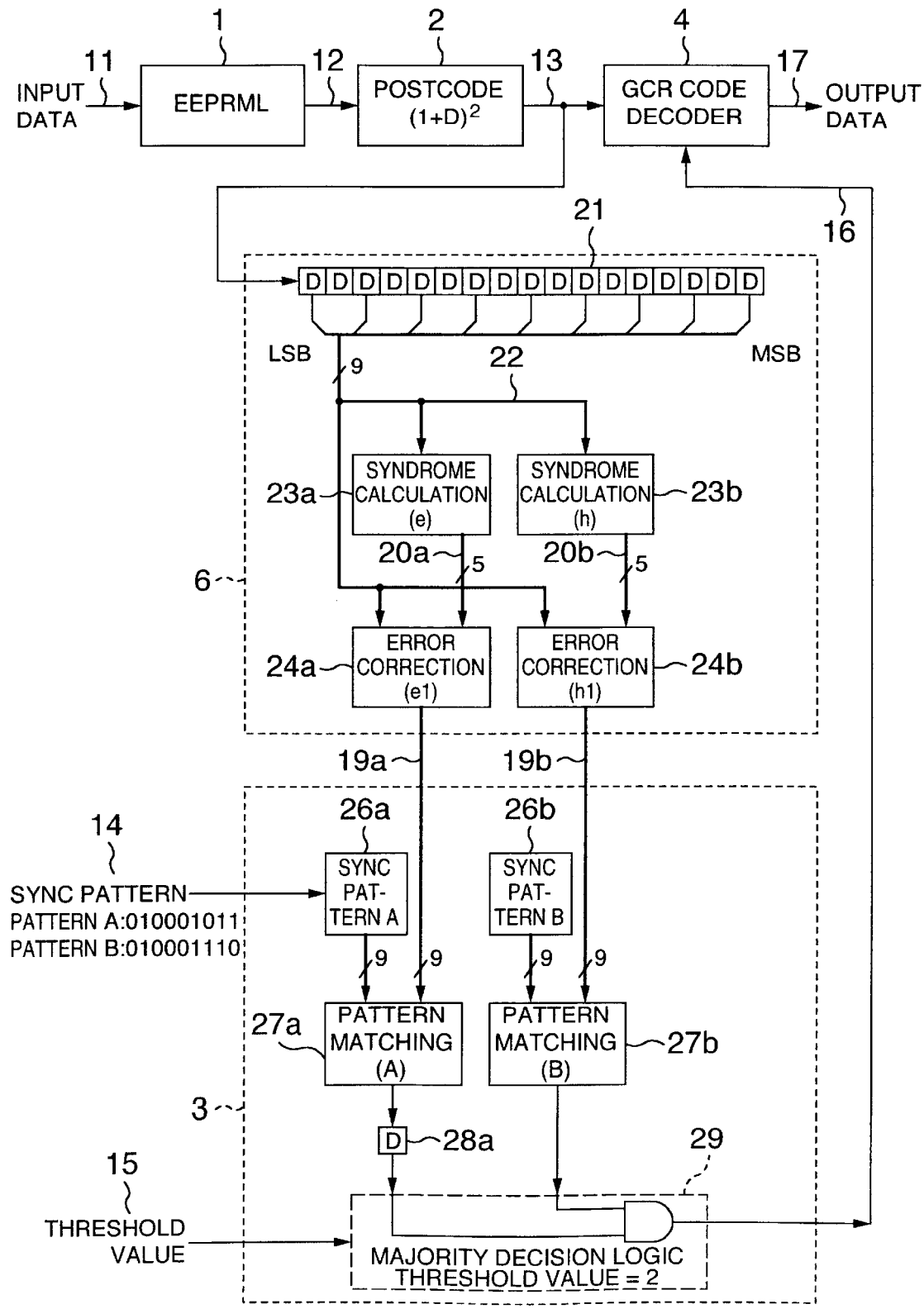
FIG. 23 is a block diagram showing a signal processing apparatus according to yet another embodiment of the invention related to the embodiment of FIG. 22.

The configuration of FIG. 23 is similar to that of the embodiment shown in FIG. 9. However, the difference lies in that the (1+D) processing unit 5 is not included, the data discriminator 1 is a Viterbi decoder of ordinary EEPRML type not optimized for the MTR code, the post coder 2 has the characteristic of $(1+D)^2$, and the code applied to the decoder 4 is of GCR (Group Code Recording) (for example, "RATE 16/17 (0, 6/6)" IBM Technical Disclosure Bulletin Vol. 31, No. 8, January 1989, pp. 21–23). Also, the sync pattern used is the same 18-bit pattern as in the embodiment of FIG. 9, and two sync patterns "001111111100011000" and "110000000011100111" are available in the data discrimination output 12. Due to the difference in the characteristic of the post coder 2, however, the sync pattern in the post code output 13 is a 18-bit pattern of "001100000011011110".

The post code output 13 is input to a shift register 21 in the error detection/correction unit 6. The configuration of the error detection/correction unit is the same as that in the embodiment of FIG. 9. Thus, the shift register 21, the syndrome calculator 2a, the syndrome calculator 23b, the error correction unit 24a and the error correction unit 24b included in the error detector/corrector 6 are also the same as the corresponding parts of the embodiment of FIG. 9.

The sync signal detection output 16 provides the decode timing for the decoder 4 of the GCR code. As a result, a correct decoding is realized and the output data 17 is produced.

Even in the case where the MTR code or the GCR code is used as the data modulation code, a data sync pattern which improves the performance of the data sync signal detection can be selected. The same pattern can be used in this case. In addition, due to the presence of the particular pattern in each code, this embodiment can be configured the same way as the embodiment of FIG. 9. The performance of the data sync signal detection is also substantially the same. The performance of the data section, however, is varied depending on the code used.

In this embodiment, the output of the post coder is grouped into a bit string of even numbered bits and a bit string of odd numbered bits and matched. The data sync signal detector can be configured with the error detection and correction function, however, in which the output of the post-coder is divided into one or more groups of bit string by a method other than dividing it into a bit string of odd numbered bits and a bit string of even numbered bits. Nevertheless, such a configuration involves more error patterns and is complicated as compared with the embodiment under consideration, with the performance thereof inferior to this embodiment as correctable error patterns are limited.

A still further embodiment of the invention will be explained with reference to FIG. 24.

Figure 24:
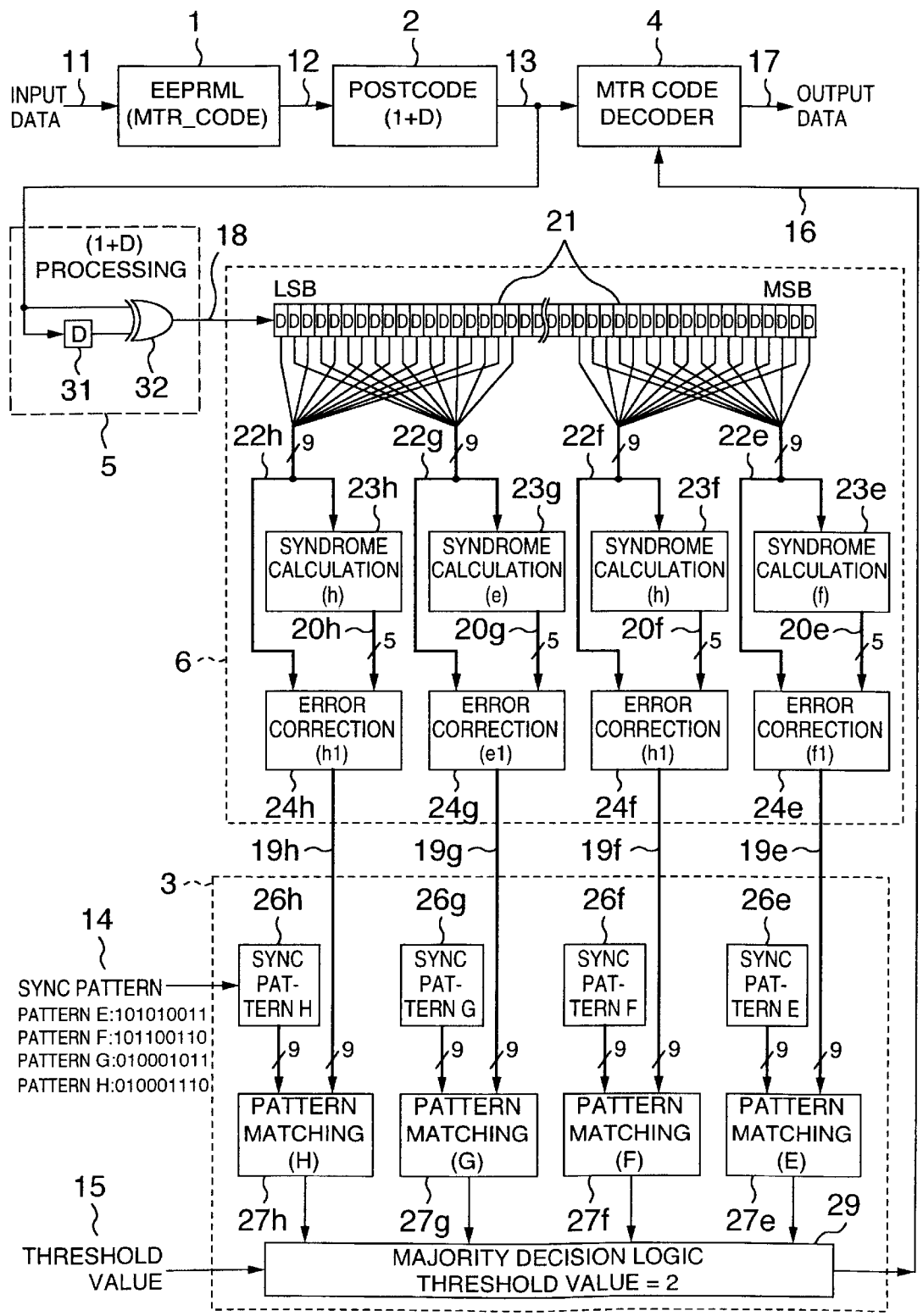
FIG. 24 is a block diagram showing a signal processing apparatus according to still another embodiment of the invention.

The basic configuration of FIG. 24 is the same as that of the embodiment shown in FIG. 13. The difference, however, lies in the configuration of the shift register 21, the manner in which the shift register output 22 is produced, the manner in which the shift register output 22 is input to the syndrome calculator 23, the manner in which the shift register output 22 is applied to the error correction unit 24, and the absence of the delay circuit. The illustrated arrangement is also different.

The shift register 21 has a length of 68 bits.

Nine bits including every other bit from the MSB side (farthest from the input of the (1+D) processing output 18) of the shift register 21 constitute a shift register output 22e and applied to the syndrome calculator 23e and the error correction unit 24e. The 9 bits one bit nearer to the LSB side (the side where the (1+D) processing output 18 is input) of the shift register output 22e constitutes the shift register output 22f and are applied to the syndrome calculator 23f and the error correction unit 24f. Nine bits including every other bit from the LSB side of the shift register 21 constitute the shift register output 22h and are applied to the syndrome calculator 23h and the error correction unit 24h. The 9 bits one bit nearer to the MSB side of the shift register output 22h constitutes the shift register output 22g, and are applied to the syndrome calculator 23g and the error correction unit 24g.

The shift register 21 is lengthened and the output retrieve position thereof is selected, so that the shift register 21 can have the function and effect of the delay circuits 28e to 28g in the embodiment of FIG. 13. This effect can eliminate the delay lines 28e to 28g. The shift register may be less than 68 bit length, for example, 36 or 37 or more bit length so that the register output is divided in groups with 0 or 1 or more bits of an arbitrary pattern interposed therebetween.

The configuration of FIG. 24 is exactly equivalent to the configuration of the embodiment shown in FIG. 11.

Figure 25:
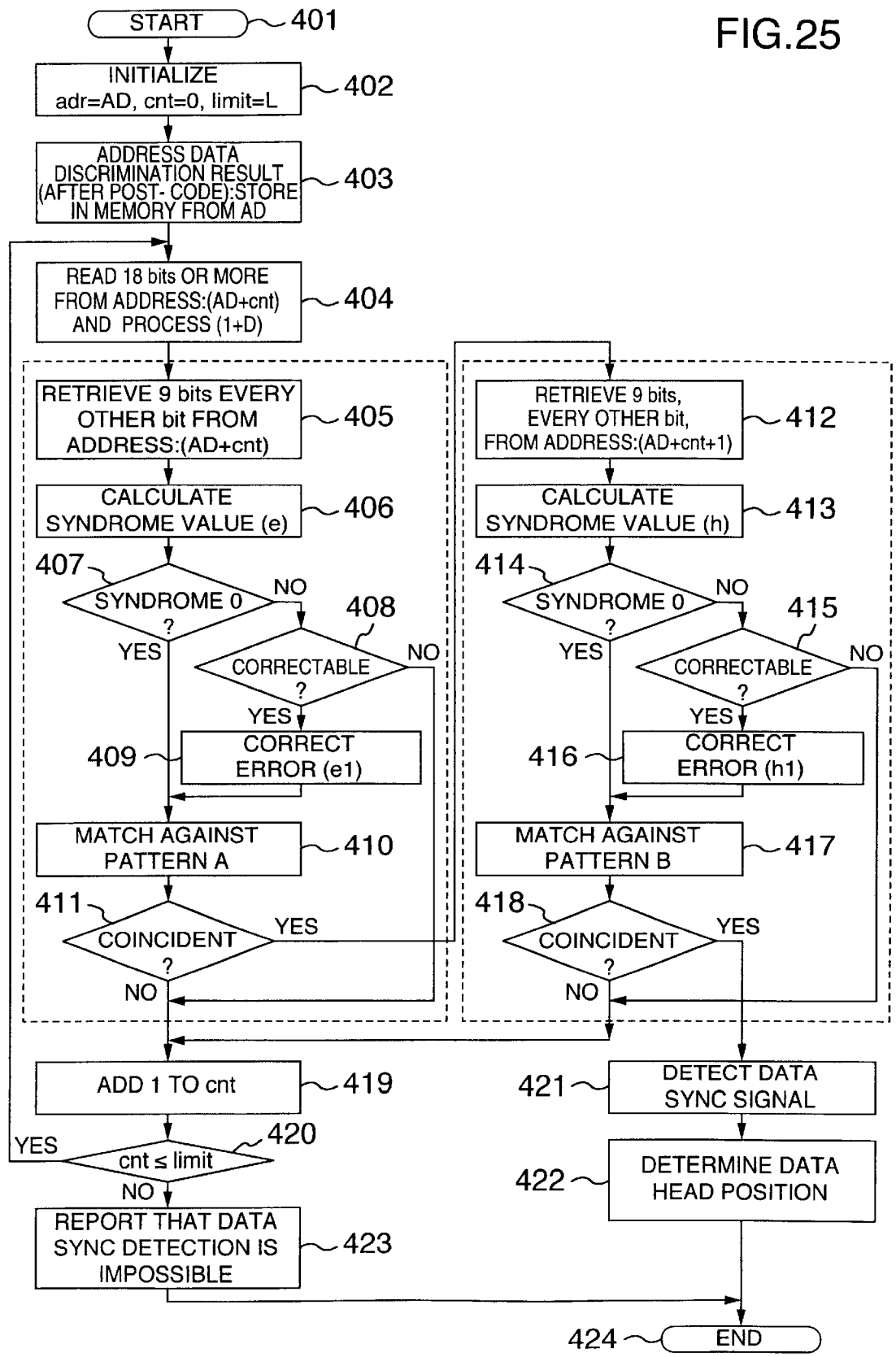
FIG. 25 is a flowchart showing a method of detecting the data sync signal according to a yet further embodiment of the invention.

With reference to FIG. 25, a yet further embodiment of the invention will be explained.

FIG. 25 is a flowchart for realizing, by software, a data sync signal detector having the configuration of the embodiment shown in FIG. 9. The functions to be realized are the same as those of the embodiment of FIG. 9, and so are the data sync pattern and the method of error detection and correction.

First, the process starts from step 401, and the initialization required for data sync detection is performed in step 402. The storage starting address adr of the memory for storing the value of the post-code output data is set to the value of AD, the program control count cnt to zero and the program control count limit value to L.

Then, in step 403, the post-code output data 13 is stored from address AD of the memory. The memory can sufficiently store the portions before and after the data involved.

In step 404, the data of 18 bits or more are read out of the address AD of the memory and the calculation (1+D) is performed.

In step 405, 9 bits are retrieved from every other position from the address (AD+cnt).

In step 406, the syndrome value is calculated from the particular 9 bits. This calculation is equivalent to 23a of FIG. 9. It is determined in step 407 whether the syndrome value thus calculated is zero or not. In the case where the syndrome value is zero, the process proceeds to step 410. In the case where the syndrome value is not zero, on the other hand, it is determined in step 408 whether the error can be corrected from the particular syndrome value. If the error cannot be corrected, on the other hand, the process proceeds to step 419. The error, if correctable, is corrected in step 409.

Then, the pattern is compared with the pattern A in step 410. It is determined in step 411 whether the result of comparison is coincident or not, and if not coincident, the process proceeds to step 419, otherwise to step 412.

In step 412, 9 bits including every other bit from are retrieved from the address (AD+cnt+1) of the data read from the memory and subjected to the (1+D) calculation in step 404.

In step 413, the syndrome value is calculated from the particular 9 bits. This calculation is equivalent to 23b of FIG. 9. It is determined in step 414 whether the calculated syndrome value is zero or not. If the syndrome value is zero, the process proceeds to step 417. Otherwise, it is determined in step 415 whether the error is correctable from the particular syndrome value. If the error is not correctable, the process proceeds to step 419, otherwise, the error is corrected in step 416.

Then, the pattern is compared with the pattern B in step 417. It is determined in step 418 whether the result of comparison is coincident or not, and if not coincident, the process proceeds to step 419. Otherwise, the process proceeds to step 421.

In step 421, both the matching patterns A and B are coincident, indicating that the data sync signal detection is possible.

Then in step 422, the head address of the data is determined from the program control count cnt and the process is terminated in step 424.

In the case where the data sync signal is not detected, the process proceeds to step 419, where 1 is added to the program control count cnt, and it is determined in step 420 whether this program control count cnt is not more than the program control count limit. If it is within the limit, the process returns to step 404 for proceeding with the data sync signal detection. By adding 1 to the program control count cnt, the syndrome value can be calculated or the bit position for pattern matching can be displaced bit by bit.

In the case where the determination in step 420 is that the program control count cnt exceeds the limit, on the other hand, the data sync signal detection is impossible, and the fact is reported in step 423, with the process terminated in step 424. The program control count limit "limit" represents and defines the range where the data sync signal can be stored in memory.

The foregoing description refers to the case where the data sync signal detector according to the embodiment of FIG. 9 is realized in software. Nevertheless, the other embodiments can of course be realized also in software. It is also possible to realize the software as a computer-readable program embodied on the recording medium.

Figure 15:
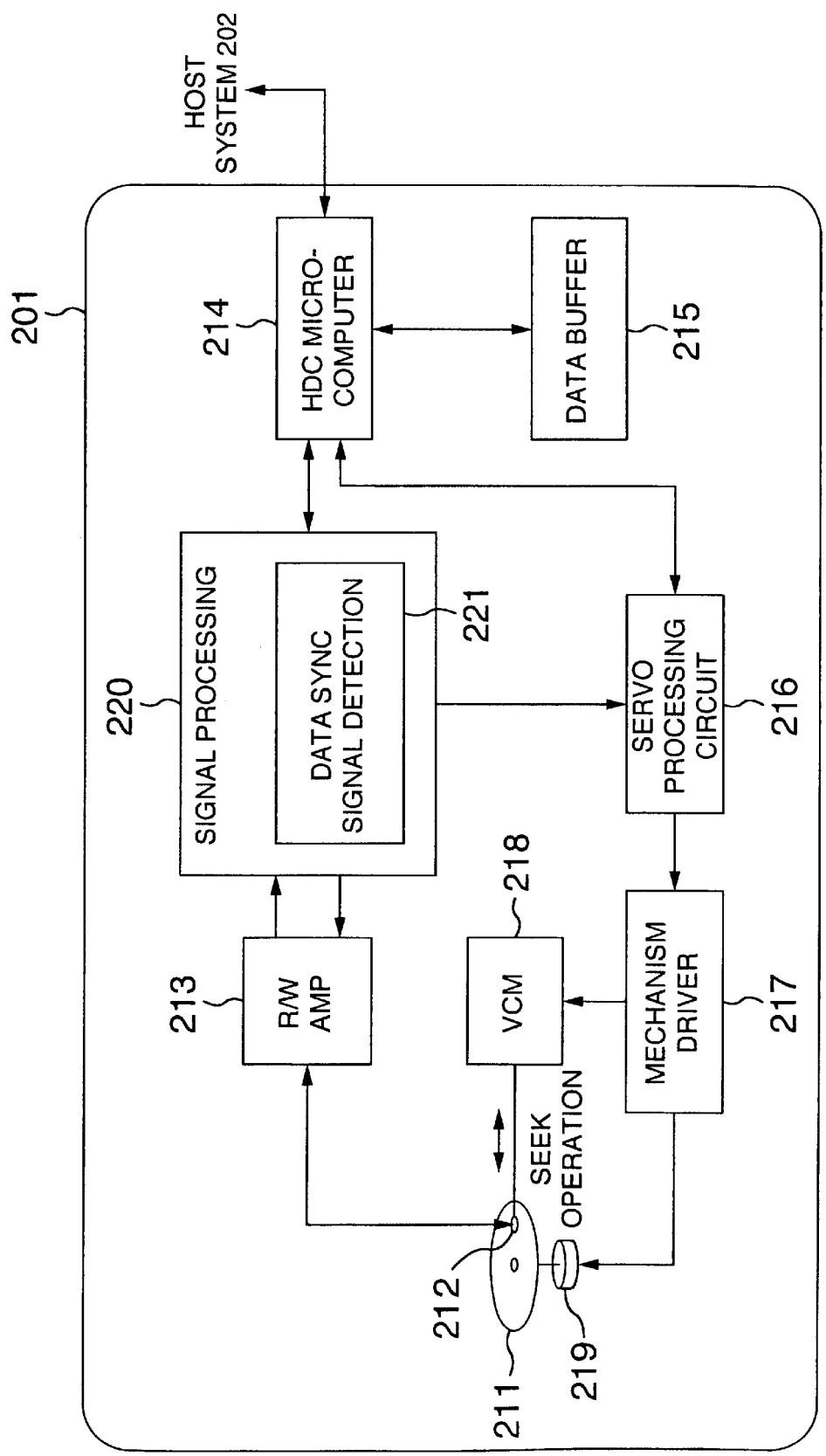
FIG. 15 is a block diagram showing an internal configuration of a magnetic disk drive according to a further embodiment of the invention.

FIG. 15 is a block diagram showing an example configuration of a magnetic disk device according to an embodiment of the invention. The magnetic disk device shown in FIG. 15 uses a signal processing apparatus according to the invention described above.

The magnetic disk device 201 comprises a magnetic disk 211 providing a data recording medium, a magnetic head 212 for recording/reproducing data on the magnetic disk 211, a R/W amplifier 213 for amplifying the data signal recorded/reproduced, a HDC (Hard Disk Controller) microcomputer 214 for performing the I/F control with a host system 202 and the control operation, etc. for the whole system, a data buffer 215 for temporarily storing the data exchanged with the host system 202, a servo processing circuit 216 for processing the servo control signal recorded in the magnetic disk 211, a mechanism driver 217 for controlling a motor 219 for rotationally driving a magnetic disc 211 or a VCM (Voice Coil Motor) 218 which sets the magnetic head 212 in position based on a command from the servo processing circuit 216, and a signal processing circuit 220 for coding and modulating the data recorded in the magnetic disk 211 and decoding the data read from the magnetic disk 211.

The signal processing circuit 220 is configured with the signal processing apparatus according to the embodiments of FIGS. 3, 9, 10, 11, 23, 24 or 25 or a modification thereof, and includes a data sync signal detector 221. The magnetic disk device 201 having this configuration can be realized with a small detection error rate of the data sync signal.

Specifically, the recording density of the magnetic disk 211 can be improved by employing the signal processing system such as a data discriminator including a Viterbi decoder, and at the same time, the error rate can be reduced by improving the data sync signal detection performance by the employment of the data sync signal detector 221 at the same time.

Also, the production cost is reduced by reducing the circuit size of the signal processing system for detecting the data sync signal such as the data sync signal detector 221 while at the same time reducing the error rate by improving the data sync signal detection performance.

The invention developed by the present inventor has been described specifically above based on embodiments thereof. The present invention, however, is not limited to the embodiments described above but can be modified in various ways without departing from the scope and spirit of the invention.

In the foregoing description, for example, the data sync signal detection system of the signal processing apparatus according to the invention is referred to as an example of a magnetic disk device. In addition to the magnetic disk device, however, the invention can be used with an information processing signal processing circuit, an integrated circuit, a magneto-optic device, a floppy disk drive, etc. with equal effect.

The features of the invention other than those described in the appended claims are as follows.

A 2-bit continuous error and a one-bit error at the ends of the group can be detected and corrected by the error detection/correction unit.

The 2-bit error having an error pattern xOx (x indicates an error bit, and 0 a bit not an error) and the one-bit error at the second position from each end of the group can be detected and corrected by the error detection/correction unit (FIG. 8).

The data sync signal is detected in the case where the threshold value for data sync signal detection is set to 2 and the number of coincident bit string groups is 2 or more (FIGS. 9 to 11).

The signal processing apparatus is formed of integrated circuits.

The signal processing system of signal processing apparatus according to this invention is used with the magnetic disk device, the magneto-optical disk device or the optical disk device.

In a signal processing apparatus according to the embodiments described above, the detection error can be reduced in the data sync signal detection.

Also, the signal processing apparatus described in the embodiments above has the effect of improving the data sync signal detection performance of the data sync signal detector with the improvement of the reproduction performance of the data section.

Further, the configuration of the data sync signal detector is simple and the circuit size can be reduced.

In the magnetic disk drive according to the aforementioned embodiments, the recording density is improved by the employment of a signal processing system including a Maximum-Likelihood or Viterbi decoder while at the same time reducing the error rate by the improvement of the data sync signal detection performance.

Also, in the magnetic disk device according to the above-mentioned embodiments, the production cost is reduced by the reduced circuit size of the signal processing system for detecting the data sync signal and the error rate can be reduced by the improved data sync signal detection performance at the same time.

What is claimed is:

1. A data signal processing apparatus comprising:
   a data discriminator receiving an input data bit string;
   a post-coder which is connected to receive a bit string including data and data sync signals from said data discriminator and performs a predetermined post-code processing on said bit string;
   a decoder which is connected to receive the post-code processed bit string output from said post-coder, and decodes the post-code processed bit string to output reproduced data;
   a (1+D) processing unit which is connected to receive the post-code processed bit string output from said post-coder and performs a (1+D) processing on the post-code processed bit string; and
   a data sync signal detector which is connected to sequentially receive the (1+D) processed bit string from said (1+D) processing unit to detect the data sync signals, said decoder performing the decode operation upon detection of each data sync signal by said data sync signal detector;
   wherein said data sync signal detector includes a separator which separates the (1+D) processed bit string into a bit string of odd numbered bits and a bit string of even numbered bits and outputs each of the bit strings separated into a group of more bits of an arbitrary bit pattern interposed therebetween, a matching unit, provided one for each group, which compares a pattern of the bit string in each group with a corresponding predetermined sync pattern to detect a coincidence therebetween, and a decision unit which indicates detection of a data sync signal to said decoder when the number of groups that coincide with respective sync patterns is equal to or larger than a predetermined threshold value.

2. A data signal processing apparatus according to claim 1, further comprising
   an error detectionl correction unit interposed between said (1+D) processing unit and said data sync signal detector for correcting the error of said bit string of the (1+D) processed code.

3. A data signal processing apparatus according to claim 2, wherein said predetermined sync pattern used for matching includes any one selected from the following forty-four 9-bit patterns:
   000101001, 000101011, 000101111, 000110101, 000110111, 000111011, 000111101, 001000111, 001001101, 001011110, 001101110, 001110110, 010000101, 010000111, 010001011, 010001101, 010001110, 010110001, 010110010, 010110011, 010111100, 011010001, 011100001, 011101011, 011101100, 100001101, 100010110, 100011010, 100011100, 100100011, 101000111, 101001001, 101010011, 101010111, 101011000, 101011011, 101100110, 101110011, 110010111, 110101110, 110111000, 110111100, 111010011, 111010110, said predetermined sync pattern being such that no continuous data inversions exist in a bit string pattern of the code before being separated into said bit string of odd numbered bits and said bit string of even numbered bits.

4. A data signal processing apparatus comprising:
   a data discriminator which receives an input data string;
   a post-coder which is connected to receive a bit string including data and data sync signals from said data discriminator and performs a predetermined post-code processing on said bit string;
   a decoder which is connected to receive the post-code processed bit string output from said post-coder, and decodes the post-code processed bit string to output reproduced data; and
   a data sync signal detector which is connected to receive said post-code processed bit string and matches a pattern of said post-code processed bit string against a predetermined sync pattern to detect each of said data sync signals, said decoder performing the decode operation upon detection of each data sync signal, wherein a total number of bits of the pattern used for matching in said data sync signal detector is 18 bits or less, and assuming that Be is the ratio of occurrence of an error event to the total number of output bits from said data discriminator and Se is the ratio of occurrence of the data sync signal detection error to the number of requests for data sync signal detection, Se can be approximated by the characteristic expressed by Equation 1, 2 or 3 below in the range of Be not more than 0.1, $$Se = 7Be^{1.20} \qquad \text{Eq. 1}$$

$$Se = 12Be^{1.42} \qquad \text{Eq. 2}$$

$$Se = 20Be^{1.64} \qquad \text{Eq. 3}$$

5. A data signal processing apparatus comprising:
   a data discriminator which receives an input data string;
   a post-coder which is connected to receive a bit string including data and data sync signals from said data discriminator and performs a predetermined post-code processing on said bit string;
   a decoder which is connected to receive the post-code processed bit string output from said post-coder, and decodes the post-code processed bit string to output reproduced data; and a data sync signal detector which is connected to receive said post-code processed bit string and matches a pattern of said post-code processed bit string against a predetermined sync pattern to detect each of said data sync signals, said decoder performing the decode operation upon detection of each data sync signal, wherein a total number of bits of the pattern used for matching in said data sync signal detector is 36 bits or less, and assuming that Be is the ratio of occurrence of an error event to the total number of output bits from said data discriminator and Se is the ratio of occurrence of the data sync signal detection error to the number of requests for data sync signal detection, Se can be approximated by the characteristic expressed by Equation 1 or 2 below in the range of Be not more than 0.1, $$Se = 90Be^{2.51} \quad \text{Eq. 1}$$

$$Se = 160Be^{3.15} \quad \text{Eq. 2}$$

6. A magnetic disk device comprising:

a magnetic disk;

a magnetic head which records and reproduces data on said magnetic disk; and a signal processing apparatus which encodes said data to be recorded on said magnetic disk through said magnetic head and decodes said data reproduced from said magnetic disk, wherein said signal processing apparatus includes;

a data discriminator which receives a data bit string read from said magnetic head;

a post-coder which is connected to receive a bit string containing data and data sync signals output from said data discriminator and performs a predetermined post-code processing on said received bit string;

a decoder which is connected to receive a post-coded bit string output from said post-coder, performs a predetermined decoding on said bit string and outputs reproduced data;

a (1+D) processing unit which is connected to receive said post-coded bit string output from said post-coder and performs (1+D) processing on said received bit string; and a data sync signal detector which is connected to receive the (1+D) processed bit string from said (1+D) processing unit and detects said data sync signal; said decoder performing the decode operation upon detection of the data sync signal by said data sync signal detector;

wherein said data sync signal detector includes a separator which separates the (1+D) processed bit string into a bit string of odd numbered bits and a bit string of even numbered bits and outputs each of the bit strings separated into a group of bit strings or two or more groups of bit strings with or without a string of 1 or more bits of an arbitrary bit pattern interposed therebetween, a matching unit, provided one for each group, which matches a pattern of the bit string in each group against a corresponding predetermined sync pattern to detect a match therebetween, and a decision unit which indicates detection of a data sync signal to said decoder when a number of groups that coincide with respective sync patterns is equal to or larger than a predetermined threshold value.

7. A magnetic disk device according to claim 6, wherein said signal processing apparatus further includes an error detection/correction unit interposed between said (1+D) processing unit and said data sync signal detector for correcting the error of said (1+D) processed bit string.

8. A data signal processing apparatus comprising:

a data discriminator which receives an input bit string;

a post-coder which is connected to receive a bit string including data and data sync signals output from said data discriminator and performs a predetermined post-code processing on said bit string;

a decoder which is connected to receive the post-code processed bit string output from said post-coder, and decodes the post-code processed bit string to output reproduced data;

an error detection/correction unit which is connected to receive the post-code processed bit string output from said post-coder and performs an error detection/correction on said bit string; and a data sync signal detector which is connected to sequentially receive the error-detected/corrected bit string from said error detection/correction unit to detect the data sync signals, said decoder performing the decode operation upon detection of each data sync signal by said data sync signal detector;

wherein said error detection/correction unit includes a separator which separates the post-coded bit string into at least one bit string and outputs each bit string in a group of bit string or two or more groups of bit string, and an error detection/correction unit, provided for each group, for detecting and correcting an error of the bit string of each group, and wherein said data sync signal detector includes a matching unit, provided one for each group, which matches a pattern of the bit string of each group after error detection/correction against a corresponding predetermined sync pattern to detect a coincidence therebetween, and a decision unit which indicates detection of a data sync signal to said decoder when a number of groups that coincide with respective sync patterns is equal to or larger than a predetermined threshold value.

9. A data signal processing apparatus according to claim 8, wherein said separator separates the post-coded bit string into a bit string of odd numbered bits and a bit string of even numbered bits and outputs each of the bit string of odd numbered bits and the bit string of even numbered bits in at least one group of bit string.

10. A data sync signal detection apparatus comprising:

a separator which receives a bit string containing data and data sync signals output from a data discriminator, separates said bit string into one group of bit string or a plurality of groups of bit string, and outputs said bit string in said one or plurality of groups of bit string;

an error detection/correction unit, provided for each of said groups, which detects and corrects an error in each group; and a sync signal detector which detects the data sync signals by matching said discriminated and error corrected bit string of said each group against a corresponding predetermined data sync pattern.

11. A data sync signal detection method comprising the steps of:

receiving a bit string containing data and data sync signals output from a data discriminator and performing a predetermined post-code processing on said bit string;

performing (1+D) processing on the post-coded bit string;

detecting each of said data sync signal from said (1+D) processed bit string; and performing a predetermined decode operation on said post-coded bit string upon detection of said each data sync signal;

wherein said data sync signal detection step includes the substeps of separating said (1+D) processed bit string into a bit string of odd numbered bits and a bit string of even numbered bits, outputting each of said bit strings separated into one bit-string group or two or more bit-string groups divided with or without an arbitrary pattern of a bit string of at least one bit interposed therebetween, matching a bit string pattern of each group against a corresponding predetermined sync pattern thereby to decide whether they coincide with each other, and in the case where a number of groups coinciding with said predetermined sync pattern is not less than a predetermined threshold value, indicating the detection of said data sync signal to said predetermined decode operation.

12. A data sync signal detection method according to claim 11, further comprising the step, inserted between said (1+D) processing step and said data sync signal detection step, for detecting and correcting an error in the (1+D) processed bit string.

13. A data sync signal detection apparatus comprising:

a (I+D) processing unit which receives a post-coded bit string containing data and data sync signals output from a data discriminator and performs (I+D) processing on said bit string; and a data sync signal detector which detects said data sync signals from the (1+D) processed bit string output from said (1+D) processing unit;

wherein said data sync signal detector includes a separator which separates the (1+D) processed bit string into a bit string of odd numbered bits and a bit string of even numbered bits and outputs each of the bit strings separated into a group of bit strings or two or more groups of bit strings divided with or without a string of 1 or more bits of an arbitrary bit pattern interposed therebetween, a matching unit, provided one for each group, which matches a pattern of the bit string in each group against a corresponding predetermined sync pattern to detect a coincidence therebetween, and a decision unit which indicates detection of a data sync signal to a decoder when a number of groups that coincide with respective sync patterns is equal to or larger than a predetermined threshold value.

14. A data signal processing apparatus according to claim 2, wherein said data discriminator includes a Maximum Likelihood decoder, and said decoder decodes a code with the number of continuous 1's limited to not more than a predetermined number K(K=1, 2, 3).

15. A magnetic disk device according to claim 6, wherein said data discriminator includes a Maximum Likelihood decoder, and said decoder decodes a code with the number of continuous 1's limited to not more than a predetermined number K (K=1, 2, 3).

16. A data signal processing apparatus according to claim 9, wherein said data discriminator includes a Maximum Likelihood decoder.

17. A data sync signal detection apparatus, comprising:

a separator which receives a bit string containing data and data sync signals output from a data discriminator, separates said bit string into one group of bit string or a plurality of groups of bit string, and outputs said bit string in said one or plurality of groups of bit string;

an error detection/correction unit, provided for each of said groups, which detects and corrects an error in each group; and a sync signal detector which detects the data sync signals by matching said discriminated and error corrected bit string of said each group against a corresponding predetermined data sync pattern, wherein said data discriminator includes a Maximum Likelihood decoder.

18. A data sync signal detection apparatus according to claim 13, wherein said data discriminator includes a Maximum Likelihood decoder, and said decoder decodes a code with the number of continuous 1's limited to not more than a predetermined number K (K=1, 2, 3).

19. A data signal processing apparatus according to claim 2, wherein said threshold value is 2.

20. A computer software product including a computer readable medium, said medium having stored thereon:

code means for performing (1+D) processing on a bit string obtained by performing predetermined post-code processing on a bit string containing data and data sync signals output from a data discriminator;

code means for detecting said data sync signal from said (1+D) processed bit string; and data sync signal detection code means for separating said (1+D) processed bit string into a bit string of odd numbered bits and a bit string of even numbered bits, and outputting each of said bit strings separated into one bit string group or at least two bit string groups divided with or without an arbitrary pattern of bit string of at least one bit interposed therebetween, matching a pattern of the bit string of each group against a predetermined sync pattern thereby to decide whether they are coincident or not, and upon coincidence, detecting a data sync signal.

21. A computer software product according to claim 20, further comprising code means interposed between said (1+D) processing code means and said data sync signal detection code means for detecting and correcting an error in said (1+D) processed bit string.

22. A data sync signal detection method comprising the steps of:

receiving a bit string containing data and data sync signals output from a data discriminator, outputting said bit string separated into one group or a plurality of groups of a bit string;

performing an error detection and error correction processing on each group; and matching a pattern of said discriminated and error corrected bit string of each group against a predetermined data sync pattern thereby to detect a data sync signal.

23. A computer software product including a computer readable medium, said medium having stored thereon:

code means for receiving and separating a bit string containing data and data sync signals output from a data discriminator into one group or a plurality of groups of a bit string;

code means for performing an error detection and error correction on each of said groups; and code means for matching the discriminated and error corrected bit string of each group against a corresponding predetermined data sync pattern thereby to detect a data sync signal.

24. A data signal processing apparatus according to claim 1, wherein said predetermined sync pattern used for matching includes any one selected from the following forty-four 9-bit patterns:

000101001, 000101011, 000101111, 000110101, 00011011, 000111011, 000111101, 001000111, 001001101, 00101110, 001101110, 001110110, 010000101, 010000111, 010001011, 010001101, 010001110, 010110001, 010110010, 010110011, 010111100, 011010001, 011100001, 011101011, 011101100, 100001101, 100010110, 100011010, 100011100, 100100011, 101000111, 101001001, 101010011, 101010111, 101011000, 101011011, 101100110, 101110011, 110010111, 110101110, 110111000, 110111100, 111010011, 111010110, said predetermined sync pattern being such that no continuous data inversions exist in a bit string pattern of the code before being separated into said bit string of odd numbered bits and said bit string of even numbered bits.

25. A data signal processing apparatus according to claim 9, wherein said predetermined sync pattern used for matching includes any one selected from the following forty-four 9-bit patterns:

000101001, 000101011, 000101111, 000110101, 000110111, 000111011, 000111101, 001000111, 001001101, 001011110, 001101110, 001110110, 010000101, 010000111, 010001011, 010001101, 010001110, 010110001, 010110010, 010110011, 010111100, 011010001, 011100001, 011101011, 011101100, 100001101, 100010110, 100011010, 100011100, 100100011, 101000111, 101001001, 101010011, 101010111, 101011000, 101011011, 101100110, 101110011, 110010111, 110101110, 1110111000, 110111100, 111010011, 111010110, said predetermined sync pattern being such that no continuous data inversions exist in a bit string pattern of the code before being separated into said bit string of odd numbered bits and said bit string of even numbered bits.

26. A data signal processing apparatus according to claim 9, wherein said threshold value is 2.

27. A data signal processing apparatus according to claim 1, wherein said threshold value is 1.

28. A magnetic disk device comprising:
a magnetic disk;
a magnetic head which records and reproduces data on said magnetic disk;
a signal processing apparatus which encodes said data to be recorded on said magnetic disk and decodes said data reproduced from said magnetic disk, wherein said signal processing apparatus includes:
a data discriminator which receives a data bit string read from said magnetic head;
a post-coder which is connected to receive a bit string including data and data sync signals outputted from said data discriminator and performs predetermined post-code processing on said received bit string;
a decoder which is connected to receive a post-coded bit string output from said post-coder, decodes said post-code processed bit string to output reproduced data;
an error correction/detection unit which is connected to receive said post-coded bit string and performs an error detection/correction on said bit string; and
a data sync signal detector which is connected to receive said error detected/corrected bit string from said error detection/correction unit to detect said data sync signals, said decoder performing the decode operation upon detection of each data sync signal by said data sync signal detector,
wherein said error detection/correction unit includes a separator which separates the post-coded bit string into at least one bit string and outputs each bit string in a group of bit string or two or more groups of bit string, an error detection/correction part provided for each group of bit string which error detects and corrects the bit string of each group, wherein said data sync signal detector includes a matching unit, provided one for each group, which matches a pattern of the bit string of each group after error detection/correction against a corresponding predetermined sync pattern to detect a coincidence therebetween, and a decision unit which indicates detection of a data sync signal to said decoder when a number of groups that coincides with respective sync patterns is equal to or larger than a predetermined threshold value.

29. A data sync signal detection apparatus according to claim 13, wherein said data sync signal detector further includes an error detection/correction unit which is provided between said separator and said matching units and performs error detection/correction on said each group of bit string, said matching units performs said matching on the bit string of each group after error detection/correction.

30. A magnetic disk device according to claim 28, wherein said separator separates said post-coded bit string into a string of odd numbered bits and a string of even numbered bits and outputs each of said string of odd numbered bits and string of even numbered bits in one group of bit string or divided into a plurality of groups of bit string with or without a string of at least one bit of an arbitrary pattern interposed therebetween.

31. A data sync signal detection method comprising the steps of:
separating a bit string of codes including data and data sync signals received from a data discriminator into a bit string of odd numbered bits and a bit string of even numbered bits and outputting each of said bit string of odd numbered bits and bit string of even numbered bits in a single group of bit string or in two or more groups of bit string divided with or without a bit string of at least one bit of an arbitrary pattern interposed between said groups, performing an error detection/correction on each group of bit string; and
matching a pattern of each group of bit string against a corresponding predetermined sync pattern to determine a coincidence therebetween.

32. A data sync signal detection apparatus comprising:
a separator which receives and separates a bit string of codes including data and data sync signals received from a data discriminator into a bit string of odd numbered bits and a bit string of even numbered bits and outputs each of said bit string of odd numbered bits and bit string of even numbered bits in a single group of bit string or in two or more groups of bit string with or without a bit string of at least one bit of an arbitrary pattern interposed between said groups;
an error detection/correction unit which performs an error detection/correction on each group of bit string; and matching units, one for each group of bit string, which matches a pattern of each group of bit string after error correction/detection against a corresponding predetermined sync pattern to determine a coincidence therebetween so as to detect each data sync signal.

33. A computer software product including a computer readable medium, said medium having stored thereon:

a code means for separating a bit string of codes including data and data sync signals received from a data discriminator into a bit string of odd numbered bits and a bit string of even numbered bits and outputting each bit string in a single group of bit string or in two or more groups of bit string divided with or without a string of at least one bit of an arbitrary pattern interposed therebetween;

a code means for subjecting each group of bit string to error detection and correction; and a code means for matching a pattern of each group of bit string after error detection/correction against a corresponding predetermined sync pattern for determining a matching therebetween.

\* \* \* \* \*